(12) United States Patent
Wilson et al.

(10) Patent No.: US 11,971,690 B2
(45) Date of Patent: Apr. 30, 2024

(54) STATELESS DISCRETE PREDICTIVE CONTROLLER

(71) Applicant: University of New Brunswick, Fredericton (CA)

(72) Inventors: Jacob Mark Wilson, West Branch (CA); Rickey Dubay, Fredericton (CA)

(73) Assignee: University of New Brunswick, Fredericton (CA)

( * ) Notice: Subject to any disclaimer, the term of this patent is extended or adjusted under 35 U.S.C. 154(b) by 445 days.

(21) Appl. No.: 17/280,128

(22) PCT Filed: Sep. 30, 2019

(86) PCT No.: PCT/CA2019/000137
§ 371 (c)(1),
(2) Date: Mar. 25, 2021

(87) PCT Pub. No.: WO2020/061675
PCT Pub. Date: Apr. 2, 2020

(65) Prior Publication Data
US 2022/0019181 A1 Jan. 20, 2022

Related U.S. Application Data

(60) Provisional application No. 62/738,547, filed on Sep. 28, 2018.

(51) Int. Cl.
*G05B 13/04* (2006.01)
(52) U.S. Cl.
CPC ......... *G05B 13/048* (2013.01); *G05B 13/042* (2013.01)
(58) Field of Classification Search
CPC ..... G05B 15/02; G05B 13/042; G05B 13/048
(Continued)

(56) References Cited

U.S. PATENT DOCUMENTS

| | | | |
|---|---|---|---|
| 10,060,373 B2 | 8/2018 | Wang et al. | |
| 2006/0045801 A1* | 3/2006 | Boyden | G05B 13/027 422/62 |

(Continued)

FOREIGN PATENT DOCUMENTS

| | | | | |
|---|---|---|---|---|
| CA | 2718911 A1 * | 9/2009 | | G05B 13/04 |
| CA | 2874269 | 6/2016 | | |

(Continued)

OTHER PUBLICATIONS

Matthew Ellis, Helen Durand, and Panagiotis D. Christofides, a tutorial review of economic model predictive control methods, Journal of Process Control 24 (2014), 1156-1178.

(Continued)

*Primary Examiner* — Ronald D Hartman, Jr.
(74) *Attorney, Agent, or Firm* — Eugene Derenyi

(57) ABSTRACT

A model predictive controller for a performing stateless prediction. Using closed form algebraic expressions for the step test in a dynamic matrix eliminates the requirement for individual calculation on each element. With both the dynamic matrix and the vector of predicted errors written in terms of discrete algebraic equations, the control law is written as a function of the current state of the system. The control law is then be reduced to its minimal form, which leaves the next control action to be a function of the system parameters, the past errors, and the past control actions. Since the system parameters are constant, this controller is then be reduced into a single discrete equation. This greatly reduces the computations required in each control loop iteration.

6 Claims, 27 Drawing Sheets

(58) Field of Classification Search
USPC .................................................. 700/28–29
See application file for complete search history.

(56) References Cited

U.S. PATENT DOCUMENTS

| | | | | |
|---|---|---|---|---|
| 2007/0078529 | A1* | 4/2007 | Thiele | G05B 13/048 700/29 |
| 2009/0265021 | A1* | 10/2009 | Dubay | G05B 13/04 700/33 |
| 2017/0359418 | A1* | 12/2017 | Sustaeta | G05B 13/0285 |

FOREIGN PATENT DOCUMENTS

| | | | | |
|---|---|---|---|---|
| CA | 2874269 | A1 * | 6/2016 | ........... G05B 13/026 |
| CN | 1940780 | A * | 4/2007 | ........... G05B 13/048 |
| FR | 3014569 | A1 * | 6/2015 | ............. G05B 13/04 |
| GB | 2430764 | A * | 4/2007 | ........... G05B 13/048 |
| WO | 2010088693 | | 8/2010 | |

OTHER PUBLICATIONS

Ramdane Hedjar, Redouane Toumi, Patrick Boucher, and Didier Dumur, Finite horizon nonlinear predictive control by the taylor approximation: application to robot tracking trajectory, International Journal of Applied Mathematics and Computer Science 15 (2005), No. 4, 527-540.

G. C. Kember, R. Dubay, and S. E. Mansour, On simplified predictive control as a generalization of least-squares dynamic matrix control, ISA transactions 44 (2005), No. 3, 345-352.

Michael Short, A Simplified Approach to Multivariable Model Predictive Control, International Journal of Engineering and Technology Innovation, vol. 5, No. 1, 2015, pp. 19-32.

Jacob Mark Wilson, Meaghan Charest, and Rickey Dubay, Nonlinear model predictive controller, Proceedings of the Canadian Society for Mechanical Engineers International Congress 2014, 2014.

Zhiyun Zou, Dehong Yu, Zhen Hu, Luping Yu, Wenqiang Feng, and Ning Guo, Design and simulation of nonlinear Hammerstein systems dynamic matrix control algorithm, Intelligent Control and Automation, 2006. WCICA 2006. The Sixth World Congress on, vol. 1, 2006, pp. 1981-1985.

* cited by examiner

Figure 21

| Computational Time (ms): Second Order System | | | | | | | | |
|---|---|---|---|---|---|---|---|---|
| Controller Type | Prediction Horizon (N) | Control Horizon (nu) | | | | | | |
| | | 1 | 2 | 5 | 10 | 25 | 50 | 100 |
| DMC | 100 | 0.280 | 0.362 | 0.794 | 2.261 | 3.866 | 6.534 | 11.227 |
| | 150 | 0.397 | 0.566 | 1.207 | 2.865 | 5.315 | 8.800 | 16.194 |
| | 200 | 0.449 | 0.610 | 2.318 | 3.617 | 6.443 | 11.615 | 20.985 |
| | 300 | 0.713 | 1.031 | 2.914 | 4.759 | 9.109 | 15.834 | 29.841 |
| | 500 | 1.024 | 1.997 | 3.979 | 6.961 | 13.692 | 29.705 | 48.916 |
| | 1000 | 1.755 | 3.588 | 6.514 | 11.576 | 26.124 | 53.169 | 96.021 |
| SDPC | 100 | 0.030 | 0.027 | 0.030 | 0.042 | 0.033 | 0.029 | 0.025 |
| | 150 | 0.029 | 0.030 | 0.031 | 0.037 | 0.033 | 0.026 | 0.024 |
| | 200 | 0.029 | 0.025 | 0.041 | 0.036 | 0.028 | 0.026 | 0.024 |
| | 300 | 0.033 | 0.029 | 0.036 | 0.032 | 0.027 | 0.024 | 0.023 |
| | 500 | 0.026 | 0.033 | 0.031 | 0.029 | 0.025 | 0.032 | 0.025 |
| | 1000 | 0.025 | 0.030 | 0.027 | 0.026 | 0.026 | 0.030 | 0.030 |

Figure 22

| Computational Time (ms): Second Order System | | | | | | | | |
|---|---|---|---|---|---|---|---|---|
| Controller Type | Prediction Horizon (N) | Control Horizon (nu) | | | | | | |
| | | 1 | 2 | 5 | 10 | 25 | 50 | 100 |
| DMC | 100 | 0.280 | 0.362 | 0.794 | 2.261 | 3.866 | 6.534 | 11.227 |
| | 150 | 0.397 | 0.566 | 1.207 | 2.865 | 5.315 | 8.800 | 16.194 |
| | 200 | 0.449 | 0.610 | 2.318 | 3.617 | 6.443 | 11.615 | 20.985 |
| | 300 | 0.713 | 1.031 | 2.914 | 4.759 | 9.109 | 15.834 | 29.841 |
| | 500 | 1.024 | 1.997 | 3.979 | 6.961 | 13.692 | 29.705 | 48.916 |
| | 1000 | 1.755 | 3.588 | 6.514 | 11.576 | 26.124 | 53.169 | 96.021 |
| SDPC | 100 | 0.030 | 0.027 | 0.030 | 0.042 | 0.033 | 0.029 | 0.025 |
| | 150 | 0.029 | 0.030 | 0.031 | 0.037 | 0.033 | 0.026 | 0.024 |
| | 200 | 0.029 | 0.025 | 0.041 | 0.036 | 0.028 | 0.026 | 0.024 |
| | 300 | 0.033 | 0.029 | 0.036 | 0.032 | 0.027 | 0.024 | 0.023 |
| | 500 | 0.026 | 0.033 | 0.031 | 0.029 | 0.025 | 0.032 | 0.025 |
| | 1000 | 0.025 | 0.030 | 0.027 | 0.026 | 0.026 | 0.030 | 0.030 |

Figure 23

| Computational Time (ms): First Order Plus Dead Time System ||||||||
|---|---|---|---|---|---|---|---|
| Controller Type | Prediction Horizon (N) | Control Horizon (nu) |||||||
| | | 1 | 2 | 5 | 10 | 25 | 50 | 100 |
| DMC | 100 | 0.235 | 0.417 | 0.835 | 2.288 | 4.203 | 6.713 | |
| | 150 | 0.343 | 0.494 | 1.153 | 2.983 | 5.502 | 8.959 | 18.204 |
| | 200 | 0.402 | 0.923 | 2.226 | 3.598 | 6.632 | 12.201 | 23.790 |
| | 300 | 0.614 | 0.933 | 2.849 | 4.675 | 9.231 | 16.016 | 34.549 |
| | 500 | 0.967 | 1.815 | 4.128 | 6.595 | 14.093 | 25.706 | 49.430 |
| | 1000 | 1.728 | 2.947 | 6.172 | 13.025 | 27.010 | 50.313 | 96.365 |
| SDPC | 100 | 0.130 | 0.138 | 0.143 | 0.222 | 0.181 | 0.161 | |
| | 150 | 0.120 | 0.133 | 0.152 | 0.198 | 0.171 | 0.141 | 0.162 |
| | 200 | 0.129 | 0.183 | 0.206 | 0.187 | 0.155 | 0.145 | 0.134 |
| | 300 | 0.116 | 0.119 | 0.179 | 0.165 | 0.140 | 0.122 | 0.126 |
| | 500 | 0.108 | 0.135 | 0.163 | 0.140 | 0.130 | 0.121 | 0.122 |
| | 1000 | 0.123 | 0.124 | 0.144 | 0.139 | 0.122 | 0.110 | 0.115 |

Figure 24

| Computational Time (ms): General Linear System | | | | | | | | |
|---|---|---|---|---|---|---|---|---|
| Controller Type | Prediction Horizon (N) | Control Horizon (nu) | | | | | | |
| | | 1 | 2 | 5 | 10 | 25 | 50 | 100 |
| DMC | 200 | 0.512 | 0.583 | 1.357 | 2.334 | 5.293 | 9.896 | 19.066 |
| | 300 | 0.663 | 0.891 | 1.684 | 3.303 | 7.644 | 15.165 | 29.084 |
| | 500 | 1.044 | 1.377 | 2.974 | 5.515 | 12.709 | 24.196 | 46.642 |
| | 1000 | 1.699 | 2.596 | 5.403 | 10.180 | 23.839 | 47.232 | 93.336 |
| | 2000 | 3.241 | 5.040 | 10.620 | 20.114 | 46.993 | 95.706 | 196.884 |
| | 3000 | 4.708 | 7.420 | 15.786 | 30.379 | 70.070 | 139.693 | 286.649 |
| SDPC | 200 | 0.033 | 0.028 | 0.029 | 0.028 | 0.025 | 0.024 | 0.026 |
| | 300 | 0.030 | 0.026 | 0.025 | 0.025 | 0.025 | 0.025 | 0.025 |
| | 500 | 0.028 | 0.024 | 0.027 | 0.025 | 0.025 | 0.024 | 0.024 |
| | 1000 | 0.026 | 0.026 | 0.024 | 0.024 | 0.024 | 0.024 | 0.024 |
| | 2000 | 0.025 | 0.024 | 0.026 | 0.024 | 0.024 | 0.054 | 0.067 |
| | 3000 | 0.024 | 0.026 | 0.024 | 0.034 | 0.028 | 0.064 | 0.034 |

Figure 25

| Computational Time (ms): MIMO System | | | | | | | | |
|---|---|---|---|---|---|---|---|---|
| Controller Type | Prediction Horizon (N) | Control Horizon (nu) | | | | | | |
| | | 1 | 2 | 5 | 10 | 25 | 50 | 100 |
| DMC | 100 | 0.738 | 1.252 | 2.728 | 4.241 | 10.264 | 20.299 | 37.960 |
| | 150 | 0.984 | 1.683 | 3.776 | 6.590 | 15.105 | 29.263 | 56.867 |
| | 200 | 1.282 | 2.195 | 4.742 | 8.942 | 20.920 | 39.354 | 75.531 |
| | 300 | 1.931 | 3.106 | 7.044 | 12.353 | 29.144 | 56.885 | 113.540 |
| | 500 | 2.863 | 4.939 | 10.995 | 20.354 | 47.942 | 94.137 | 194.443 |
| | 1000 | 5.565 | 9.511 | 20.845 | 39.414 | 94.556 | 194.864 | 417.486 |
| DMC | 100 | 0.035 | 0.037 | 0.036 | 0.031 | 0.032 | 0.031 | 0.030 |
| | 150 | 0.032 | 0.034 | 0.037 | 0.035 | 0.032 | 0.051 | 0.030 |
| | 200 | 0.032 | 0.033 | 0.033 | 0.034 | 0.031 | 0.030 | 0.034 |
| | 300 | 0.033 | 0.032 | 0.041 | 0.031 | 0.030 | 0.030 | 0.036 |
| | 500 | 0.030 | 0.031 | 0.032 | 0.031 | 0.035 | 0.030 | 0.066 |
| | 1000 | 0.034 | 0.029 | 0.036 | 0.030 | 0.032 | 0.059 | 0.082 |

| Computational Time (ms): Non-Linear Robot | | | | | | | | |
|---|---|---|---|---|---|---|---|---|
| Controller Type | Prediction Horizon (N) | Control Horizon (nu) | | | | | | |
| | | 1 | 2 | 5 | 10 | 25 | 50 | 100 |
| Nonlinear DMC | 100 | 8.305 | 9.302 | 15.243 | 44.246 | 190.700 | 716.563 | 3088.693 |
| | 150 | 12.931 | 12.015 | 23.797 | 62.508 | 252.182 | 955.864 | 4391.787 |
| | 200 | 16.358 | 17.638 | 31.529 | 78.982 | 321.414 | 1195.078 | 5023.934 |
| | 300 | 24.272 | 28.288 | 40.951 | 109.299 | 471.428 | 1892.880 | 7833.693 |
| | 500 | 39.845 | 38.520 | 70.595 | 174.214 | 806.135 | 3168.594 | 14071.298 |
| | 1000 | 74.541 | 74.430 | 133.787 | 315.216 | 1512.495 | 7910.230 | 27227.580 |
| Nonlinear SDPC | 100 | 0.404 | 0.307 | 0.309 | 0.369 | 0.301 | 0.257 | 0.249 |
| | 150 | 0.419 | 0.265 | 0.332 | 0.367 | 0.287 | 0.263 | 0.267 |
| | 200 | 0.411 | 0.330 | 0.337 | 0.363 | 0.285 | 0.247 | 0.254 |
| | 300 | 0.392 | 0.319 | 0.279 | 0.326 | 0.263 | 0.251 | 0.244 |
| | 500 | 0.395 | 0.263 | 0.301 | 0.315 | 0.258 | 0.241 | 0.273 |
| | 1000 | 0.352 | 0.242 | 0.284 | 0.289 | 0.261 | 0.254 | 0.269 |

STATELESS DISCRETE PREDICTIVE CONTROLLER

FIELD OF THE INVENTION

The present invention relates generally to model predictive controllers.

BACKGROUND OF THE INVENTION

As the computational power available in the control loop increases, the use of model predictive controllers are becoming more cost effective. This has allowed them to be used in industrial facilities but only on certain systems. However, systems with fast, non-linear dynamics remain out of reach due to the computational requirements every control cycle. It would therefore be desirable to have an improved model predictive controller which reduces the computational time required for each control cycle.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 21 is a table of computational times for a first order system; First Order Controller Computation Times;

FIG. 22 is a table of computational times for a second order system; Second Order Controller Computation Times;

FIG. 23 is a table of computational times for a first order plus dead time system; First Order Plus Dead Time Controller Computation Times;

FIG. 24 is a table of computational times for a general linear system; General Linear Controller Computation Times;

FIG. 25 is table of computational times for a MIMO system; MIMO Plant Controller Computation Times;

DETAILED DESCRIPTION

The present invention, in one embodiment, relates to a model predictive controller which is stateless which allows for a stateless prediction to be performed without compromising with computer time.

1. Approach

Figure 1:
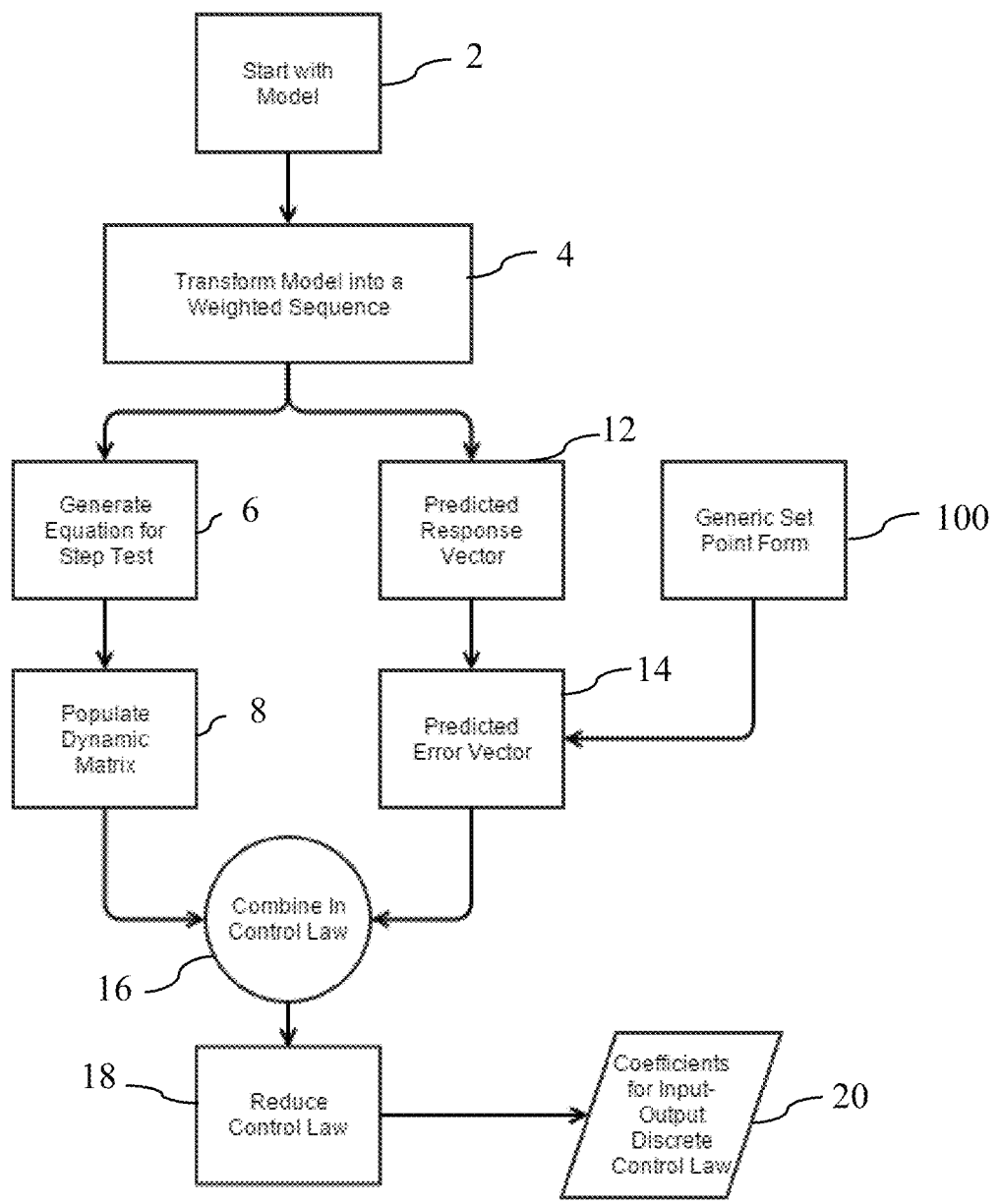
FIG. 1 is a block diagram of a method used to derive a control law for a controller according to an embodiment of the invention.

In the DMC control law, the dynamics of the system are captured using a step test and then placed into the dynamic matrix (A). In the conventional controller the dynamic matrix is populated with numerical values which means that in every control loop iteration calculations using all these elements are required to determine the new control action. Using closed form algebraic expressions for the step test in the dynamic matrix would eliminate the requirement for individual calculation on each element. FIG. 1 contains a flow diagram that outlines the procedure, according to one embodiment of the present invention, that is used to remove the redundant calculations.

With reference to FIG. 1, the procedure begins with a model of the system in step 1. This model can either be a linear or non-linear model and the form is not of significant importance because it will have to be transformed in the next block, step 2. The second block 2 is taking the model and transferring it into the discrete time domain, in a form which allows the state of the system at any time step in the future to be determined algebraically.

This discrete time model can then be used to algebraically describe each element in a unit step test of the system. With each of these individual equations the dynamic matrix can be populated with solely algebraic expressions.

Also, from the discrete time model, each element of the predicted response of the system could be generated from different algebraic equations. Combining these equations with a discrete form of the set-point, the vector of the predicted errors can be expressed.

With both the dynamic matrix and the vector of predicted errors written in terms of discrete algebraic equations, the control law can be written as a function of the current state of the system. The control law can then be reduced to its minimal form, which would leave the next control action to be a function of the system parameters, the past errors, and the past control actions. Since the system parameters are constant this controller can then be reduced into a single discrete equation. This would greatly reduce the computations required in each control loop iteration.

2. First Order Controller Theory $$J|_t = \sum_{j=1}^{N} (\hat{r}_j|_t - \hat{y}_j|_t)^2 + \sum_{i=1}^{n_u} \hat{\Lambda}_i (\Delta\hat{u}_i|_t)^2 \quad (1)$$

where: $J|_t$ Cost fucntion evaluated at time $t$ $\hat{r}_j|_t$ Set point for the $j^{th}$ time step evaluated at time $t$ $\hat{\Lambda}_i$ Weight element for the $i^{th}$ control action change In a model predictive controller the future response of the system is used in calculations to reduce the future errors of the system. To perform this reduction a cost functions for the error is required; this cost function can be seen in Eq. 1. This cost function uses the sum of squared errors for simplicity in optimization and a weighted control action sum for move suppression.

In the DMC least squares control law, a unit step test is used to create a matrix that captures the dynamics of the system. The optimization can then be reduced to the following equation, which is the DMC unconstrained control law.

$$\Delta\hat{u} = (A^T A + \hat{\Lambda} I)^{-1} A^T \hat{e} \quad (2)$$

The general transfer function for a first order system is as follows.

$$G(s) = \frac{k_p}{\tau s + 1} \quad (3)$$

where: $k_p$ System Gain $\tau$ System Time Constant

Using the zero hold discrete model Eq. 3 can be rewritten into the discrete time domain. This equation (Eq. 4) is formulated assuming the control action ($\hat{u}|_t$) will be constant for k time steps ahead.

$$\hat{y}|_{t+k\Delta t} = \alpha^k y_o|_t + k_p(1-\alpha^k) u|_t \quad (4)$$

where: $\hat{y}|_t$ Predicted plant output at time $t$ $u|_t$ System input at time $t$ $\alpha$ Constant $\left(e^{\frac{-\Delta t}{\tau}}\right)$ $k$ an integer depicting a future time $\Delta t$ Time Step Using Eq. 4 the form of a step test can be derived. The initial conditions are all zero and the control action will be a constant unity so the equation can be significantly simplified.

$$\hat{c}_i = k_p(1-\alpha^i) \quad (5)$$

where: $\hat{c}_i$ $i^{th}$ Value of the Step Test

This step test data is then used to populate the dynamic matrix. Since the gain is in every term it can be factored out of the matrix.

$$A = k_p \begin{bmatrix} (1-\alpha^1) & 0 & \cdots & 0 \\ (1-\alpha^2) & (1-\alpha^1) & \cdots & 0 \\ \vdots & \vdots & \ddots & \vdots \\ (1-\alpha^N) & (1-\alpha^{N-1}) & \cdots & (1-\alpha^{N-n_u+1}) \end{bmatrix} \quad (6)$$

where: $N$ Prediction horizon length $n_u$ Control horizon length

Using this dynamic matrix and its transpose the next part of the DMC control law can be computed. To reduce high changes in the control actions a move suppression factor is used in Dynamic Matrix Control. This factor is multiplied by the diagonal in the A T A matrix.

where: $\lambda$ Move suppression factor $$(A^T A - \hat{\Lambda}I) = k_p^2 \begin{bmatrix} \lambda\sum_{i=1}^{N}(1-\alpha_i)^2 & \sum_{i=1}^{N-1}(1-\alpha^i)(1-\alpha^{i+1}) & \cdots & \sum_{i=1}^{N-n_u+1}(1-\alpha^i)(1-\alpha^{i+n_u-1}) \\ \sum_{i=1}^{N-1}(1-\alpha^i)(1-\alpha^{i+1}) & \lambda\sum_{i=1}^{N}(1-\alpha_i)^2 & \cdots & \sum_{i=1}^{N-n_u+1}(1-\alpha^i)(1-\alpha^{i+n_u-2}) \\ \vdots & \vdots & \ddots & \vdots \\ \sum_{i=1}^{N-n_u+1}(1-\alpha^i)(1-\alpha^{i+n_u-1}) & \sum_{i=1}^{N-n_u+1}(1-\alpha^i)(1-\alpha^{i+n_u-2}) & \cdots & \lambda\sum_{i=1}^{N}(1-\alpha_i)^2 \end{bmatrix} \quad (7)$$

In the control law the next step is to invert the matrix. With the plant gain factored out of the matrix the following inversion identity can be used to keep the gain separate from the control law. Generally, $$(\beta H)^{-1} = \frac{1}{\beta} H^{-1} \tag{8}$$

Using Eq. 8 in Eq. 7 gives:

$$(A^T A - \hat{\Lambda} I)^{-1} = \frac{1}{k_p^2} M^{-1} \tag{9}$$

with $$M = \begin{bmatrix} \lambda \sum_{i=1}^{N}(1-\alpha^i)^2 & \sum_{i=1}^{N-1}(1-\alpha^i)(1-\alpha^{i+1}) & \cdots & \sum_{i=1}^{N-n_u+1}(1-\alpha^i)(1-\alpha^{i+n_u-1}) \\ \sum_{i=1}^{N-1}(1-\alpha^i)(1-\alpha^{i+1}) & \lambda \sum_{i=1}^{N-1}(1-\alpha^i)^2 & \cdots & \sum_{i=1}^{N-n_u+1}(1-\alpha^i)(1-\alpha^{i+n_u-2}) \\ \vdots & \vdots & \ddots & \vdots \\ \sum_{i=1}^{N-n_u+1}(1-\alpha^i)(1-\alpha^{i+n_u-1}) & \sum_{i=1}^{N-n_u+1}(1-\alpha^i)(1-\alpha^{i+n_u-2}) & \cdots & \lambda \sum_{i=1}^{N-n_u+1}(1-\alpha^i)^2 \end{bmatrix} \tag{10}$$

The second half of the control law is $A^T \hat{e}$.

$$\hat{e} = \hat{r} - \hat{y} \tag{11}$$

For this application of the controller, the setpoint vector ($\hat{r}$) is going to be represented by a constant value.

$$\hat{e} = r \begin{bmatrix} 1 \\ 1 \\ \vdots \\ 1 \end{bmatrix} - \hat{y} \tag{12}$$

The prediction vector ($\hat{y}$) will start from the current value or state and transition to the steady state value in the form of first order plant with the same time constant as the system.

$$\hat{y}_i|_t = (1-\alpha^i)(y_{ss}|_t - y_o|_t) + y_o|_t \tag{13}$$

where: $\hat{y}_i|_t$ Prediction of the plant state i future timesteps conducted at time t
$y_{ss}|_t$ Predicted steady state value at time t
$y_o|_t$ Current or measured plant value at time t In order to find the predicted steady state value, the dynamics of the first order system has to be accounted for. At time t the system will have a new steady state value of $y_{ss}|_t$. Using this steady state value the difference between it and the current state can be stated as $dy_{ss}|_t$. For this steady state difference $dy_{ss}|_t$, the control action change has to be accounted for because it is applied at the current time step.

$$\hat{y}_i|_t = y_o|_t + (1-\alpha^i)(dy_{ss}|_t + k_p \Delta u|_t) \tag{14}$$

After one time step the plant should be at the following value. (i=1)

$$y_o|_{(t+\Delta t)} = y_o|_t + (1-\alpha)(dy_{ss}|_t + k_p \Delta u|_t) \tag{15}$$

The change between two consecutive timestep values can now be described by the difference between the value at t and t+Δt in terms of the predictions and also by the change in the steady state values.

Therefore, Δy 1 is the difference between the current position and the predicted current position after one time step.

$$\Delta y_1 = y_o|_{(t+\Delta t)} - y_o|_t \tag{16}$$

$$\Delta y_1 = y_o|_t + (1-\alpha)(dy_{ss}|_t + k_p \Delta u_t)) - y_o|_t \tag{17}$$

$$\Delta y_1 = dy_{ss}|_t - \alpha dy_{ss}|_t + k_p \Delta u_t - \alpha k_p \Delta u|_t \tag{18}$$

$$\Delta y_2 = dy_{ss}|_t + -(dy_{ss}|_{(t+\Delta t)} - k_p \Delta u|_t) \tag{19}$$

$\Delta_{y2}$ is the difference between the current difference in steady state and the difference in steady state after one time step, while accounting for the control action change.

$$\Delta y_2 = dy_{ss}|_t + -(dy_{ss}|_{(t+\Delta t)} - k_p \Delta u|_t) \tag{19}$$

$$\Delta y_2 = dy_{ss}|_t + k_p \Delta u|_t - dy_{ss}|_{(t+\Delta t)} \tag{20}$$

Equating Eq.18 and Eq.20 allows the following formula for the steady state difference to be derived.

$$dy_{ss}|_{(t+\Delta t)} = \alpha dy_{ss}|_t + \alpha k_p \Delta u|_t \tag{21}$$

Advancing the time by one timestep and rearranging the equation allows the formula to be written in the instantaneous time domain.

$$\alpha \Delta t \left( \frac{dy_{ss}|_t - dy_{ss}|_{(t-\Delta t)}}{\Delta t} \right) + (1-\alpha) dy_{ss}|_t = \alpha k_p \Delta u|_{t-\Delta t} \tag{22}$$

$$\alpha \Delta t \dot{d} y_{ss}|_t + (1-\alpha) dy_{ss}|_t = \alpha k_p \Delta u|_{t-\Delta t} \tag{23}$$

Going back to Eq.12 the prediction vector $\hat{y}$ can be written in terms of $dy_{ss}$ and the setpoint r can be written in terms of the current error e o and the current position $y_o$.

$$\hat{e}_i = (e_o + y_o) - ((1-\alpha^i) dy_{ss} + y_o) \tag{24}$$

$$\hat{e}_i = e_o - (1-\alpha^i) dy_{ss} \tag{25}$$

This allows the error vector to be broken up into two vectors.

$$\hat{e} = e_o \begin{bmatrix} 1 \\ 1 \\ \vdots \\ 1 \end{bmatrix} - dy_{ss} \begin{bmatrix} 1-\alpha \\ 1-\alpha^2 \\ \vdots \\ 1-\alpha^N \end{bmatrix} \tag{26}$$

Using this new equation for the error vector and the dynamic matrix control law, an equation can be formulated for the change in the control action.

$$\Delta \hat{u} = \frac{1}{k_p^2} M^{-1} A^T \hat{e} \quad (27)$$

$$\Delta \hat{u} = \frac{e_o}{k_p^2} M^{-1} A^T \begin{bmatrix} 1 \\ 1 \\ \vdots \\ 1 \end{bmatrix} - \frac{dy_{ss}}{k_p^2} M^{-1} A^T \begin{bmatrix} 1-\alpha \\ 1-\alpha^2 \\ \vdots \\ 1-\alpha^N \end{bmatrix} \quad (28)$$

Using the $\hat{w}$ and $\hat{z}$ vectors, Eq. 28 can be rewritten.

$$\Delta \hat{u} = \frac{e_o}{k_p} \hat{w} - \frac{dy_{ss}}{k_p} \hat{z} \quad (29)$$

where: $\hat{z} = M^{-1} \begin{bmatrix} \sum_{i=1}^{N} (1-\alpha^i)^2 \\ \sum_{i=1}^{N-1} (1-\alpha^i)(1-\alpha^{i+1}) \\ \vdots \\ \sum_{i=1}^{N-n_u+1} (1-\alpha^i)(1-\alpha^{i+n_u-1}) \end{bmatrix}$ $\hat{w} = M^{-1} \begin{bmatrix} \sum_{i=1}^{N} (1-\alpha^i)^2 \\ \sum_{i=1}^{N-1} (1-\alpha^i) \\ \vdots \\ \sum_{i=1}^{N-n_u+1} (1-\alpha^i) \end{bmatrix}$ Only the first element of the control action change vector will be used so the equation can be reduced.

$$\Delta u = \frac{\hat{w}_1}{k_p} e - \frac{\hat{z}_1}{k_p} dy_{ss} \quad (30)$$

where: $\Delta u = \Delta \hat{u}_1$

Taking the Laplace transform of Eq.30, the controller can be placed in a closed loop block diagram.

$$\Delta U(s) = \frac{\hat{w}_1}{k_p} E(s) - \frac{\hat{z}_1}{k_p} dY_{ss}(s) \quad (31)$$

To find $dY_{ss}(s)$ the Laplace transform is taking of Eq.23.

$$\alpha \Delta t s dY_{ss}(s) + (1-\alpha) dY_{ss}(s) = \alpha k_p \Delta U(s) \quad (32)$$

$$dY_{ss}(s) = \frac{\alpha k_p}{\alpha \Delta t s + (1-\alpha)} \Delta U(s) \quad (33)$$

$$u|_t = u|_{(t-\Delta t)} + \Delta u|_t \quad (34)$$

$$\Delta t \left( \frac{u|_t - u|(t-\Delta t)}{\Delta t} \right) = \Delta u|_t \quad (35)$$

$$\frac{U(s)}{\Delta U(s)} = \frac{1}{\Delta t s} \quad (36)$$

Figure 2:
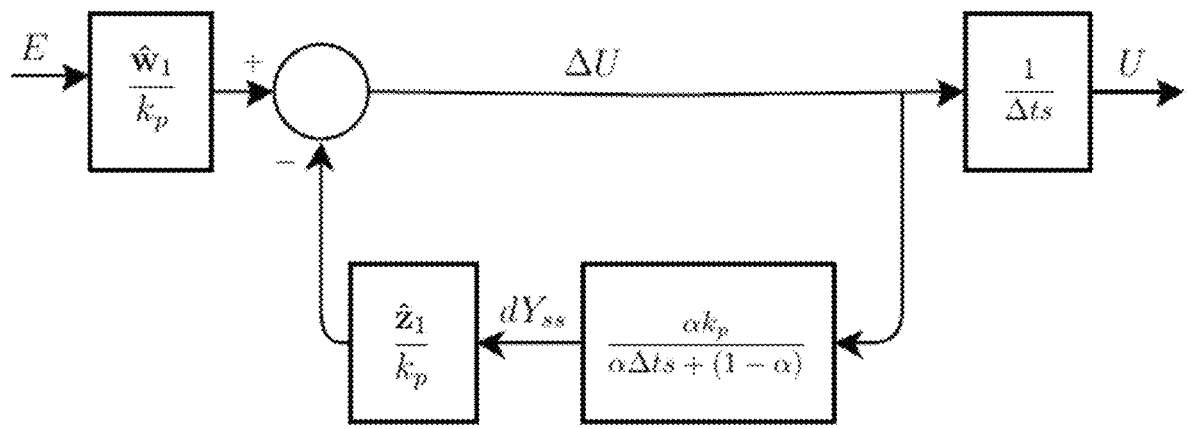
FIG. 2 is a block diagram for a Dynamic Model Controller (DMC) controller; DMC Controller Block Diagram.

Using the Laplace transform equations Eq. 31, Eq. 33, and Eq. 36 a block diagram for the DMC controller can be drawn, FIG. 2. Using the block diagram reduction law for feed back loop this block diagram can be reduced to a single closed loop block.

$$\frac{U(s)}{E(s)} = \frac{\hat{w}_1(\alpha \Delta t s + (1-\alpha))}{k_p \Delta t s(\alpha \Delta t s + (1-\alpha) + \hat{z}_1 \alpha)} \quad (37)$$

Converting Eq. 37 from continuous to discrete creates the control law for the stateless discrete predictive controller.

$$u|_t = (b_0)e|_t + (b_1)e|_{(t-\Delta t)} - (a_1)u|_{(t-\Delta t)} - (a_2)u|_{(t-2\Delta t)} \quad (38)$$

where: $a_1 = -\frac{1+\alpha+\hat{z}_1\alpha}{1+\hat{z}_1\alpha}$ $a_2 = \frac{\alpha}{1+\hat{z}_1\alpha}$ $b_0 = \frac{\hat{w}_1}{k_p(1+\hat{z}_1\alpha)}$ $b_1 = -\frac{\hat{w}_1\alpha}{k_p(1+\hat{z}_1\alpha)}$ 3. Second Order Controller Theory Using the zero hold discrete model an equation for a second order system can be generated. In generating a step response the initial conditions are all zero and the control action will be constant at one (1) so the equation can be simplified to the equation seen in Eq. 39.

$$\hat{c}_i = k_p \left( 1 - e^{-\zeta \omega_n \Delta t i} \cos(\omega_d \Delta t i) - \frac{\zeta \omega_n}{\omega_d} e^{-\zeta \omega_n \Delta t i} \sin(\omega_d \Delta t i) \right) \quad (39)$$

where: $\hat{c}_i$ Step test value at the $i^{th}$ time step $k_p$ System gain $\zeta$ Dampening ratio $\omega_n$ Natural frequency $\omega_d$ Damped natural frequency $\Delta t$ Time step $i$ Indexing variable To assist in the derivation the gain is separated from the remainder of the response using the following convention.

$$\hat{c}_i = k_p \hat{c}'_i \quad (40)$$

This step test data is then used to populate the dynamic matrix.

$$A = k_p \begin{bmatrix} \hat{c}'_1 & 0 & \cdots & 0 \\ \hat{c}'_2 & \hat{c}'_1 & \cdots & 0 \\ \vdots & \vdots & \ddots & \vdots \\ \hat{c}'_N & \hat{c}'_{N-1} & \cdots & \hat{c}'_{N-n_u+1} \end{bmatrix} \qquad (41)$$

where: $N$ Prediction horizon length
$n_u$ Control horizon length

Using this dynamic matrix and its transpose the next matrix that is used in the optimization can be computed. This also includes the move suppression factor.

Using this dynamic matrix and its transpose the next matrix that is used in the optimization can be computed. This also includes the move suppression factor.

$$(A^T A - \hat{\lambda} I) = k_p^2 \begin{bmatrix} \lambda \sum_{i=1}^{N} (\hat{c}'_i)^2 & \sum_{i=1}^{N-1} (\hat{c}'_i)^2(\hat{c}'_{i+1}) & \cdots & \sum_{i=1}^{N-n_u+1} (\hat{c}'_i)(\hat{c}'_{i+n_u-1}) \\ \sum_{i=1}^{N-1} (\hat{c}'_i)^2(\hat{c}'_{i+1}) & \lambda \sum_{i=1}^{N-1} (\hat{c}'_i)^2 & \cdots & \sum_{i=1}^{N-n_u+1} (\hat{c}'_i)(\hat{c}'_{i+n_u-2}) \\ \vdots & \vdots & \ddots & \vdots \\ \sum_{i=1}^{N-n_u+1} (\hat{c}'_i)(\hat{c}'_{i+n_u-1}) & \sum_{i=1}^{N-n_u+1} (\hat{c}'_i)(\hat{c}'_{i+n_u-2}) & \cdots & \lambda \sum_{i=1}^{N-n_u+1} (\hat{c}'_i)^2 \end{bmatrix} \qquad (42)$$

where: $\lambda$ Move suppression factor

Using this dynamic matrix and its transpose the next matrix that is used in the optimization can be computed. This also includes the move suppression factor.
where: $\lambda$ Move suppression factor The next step is to invert the matrix but with the plant gain factored out of the matrix. The following inversion identity can be used to keep the gain separate from the control law.

$$(kA)^{-1} = \frac{1}{k} A^{-1} \qquad (43)$$

It follows:

$$(A^T A - \hat{\lambda} I)^{-1} = \frac{1}{k_p^2} M^{-1} \qquad (44)$$

$$M = \begin{bmatrix} \lambda \sum_{i=1}^{N} (\hat{c}'_i)^2 & \sum_{i=1}^{N-1} (\hat{c}'_i)(\hat{c}'_{i+1}) & \cdots & \sum_{i=1}^{N-n_u+1} (\hat{c}'_i)(c\hat{c}'_{i+n_u-1}) \\ \sum_{i=1}^{N-1} (\hat{c}'_i)(\hat{c}'_{i+1}) & \lambda \sum_{i=1}^{N-1} (\hat{c}'_i)^2 & \cdots & \sum_{i=1}^{N-n_u+1} (\hat{c}'_i)(\hat{c}'_{i+n_u-2}) \\ \vdots & \vdots & \ddots & \vdots \\ \sum_{i=1}^{N-n_u+1} (\hat{c}'_i)(\hat{c}'_{i+n_u-1}) & \sum_{i=1}^{N-n_u+1} (\hat{c}'_i)(\hat{c}'_{i+n_u-2}) & \cdots & \lambda \sum_{i=1}^{N-1} (\hat{c}'_i)^2 \end{bmatrix} \qquad (45)$$

The second half of the optimization formula is $A^T \hat{e}$, where $\hat{e}$ is found through Eq. 46.

$$\hat{e} = \hat{r} - \hat{y} \qquad (46)$$

For this application of the controller the setpoint vector ($\hat{r}$) is going to be represented by a scalar value.

$$\hat{e} = r - \hat{y} \qquad (47)$$

The prediction vector can then be formulated using the time derivation of the system $$y_i|_t = u|_{(t-\Delta t)} k_p \left( 1 - e^{-\zeta \omega_n \Delta ti} \cos(\omega_d \Delta ti) - \frac{\zeta \omega_n}{\omega_d} e^{-\zeta \omega_n \Delta ti} \sin(\omega_d \Delta ti) \right) + \qquad (48)$$

$$y_o|_t \left( e^{-\zeta \omega_n \Delta ti} \cos(\omega_d \Delta ti) + \frac{\zeta \omega_n}{\omega_d} e^{-\zeta \omega_n \Delta ti} \sin(\omega_d \Delta ti) \right) +$$

-continued $$\left( \frac{y_o|_t - y_o|_{(t-\Delta t)}}{\Delta_t} \right) \frac{1}{\omega_d} e^{-\zeta \omega_n \Delta ti} \sin(\omega_d \Delta ti)$$

Adding the control action dynamics and current position dynamics together allows the equation to be simplified.

$$\hat{y}_i|_t = (u|_{(t-\Delta t)} k_p - y_o|_t) \qquad (49)$$

$$\left( 1 - e^{-\zeta \omega_n \Delta ti} \cos(\omega_d \Delta ti) - \frac{\zeta \omega_n}{\omega_d} e^{-\zeta \omega_n \Delta ti} \sin(\omega_d \Delta ti) \right) +$$

$$y_o|_t + \left( \frac{y_o|_t - y_o|_{(t-\Delta t)}}{\Delta t} \right) \frac{1}{\omega_d} e^{-\zeta \omega_n \Delta ti} \sin(\omega_d \Delta ti)$$

Replacing the prediction vector in Eq. 47 with Eq. 49 the error vector can be written in terms of the current error value ($e_o = r - y_o$).

Rearranging Eq. 50 allows the error vector to be written as three separate vectors.

$$\hat{e} = e_o|_t - (u|_{(t-\Delta t)}k_p - y_o|_t) \quad (50)$$

$$\left(1 - e^{-\zeta\omega_n\Delta ti}\cos(\omega_d\Delta ti) - \frac{\zeta\omega_n}{\omega_d}e^{-\zeta\omega_n\Delta ti}\sin(\omega_d\Delta ti)\right) -$$

$$\left(\frac{y_o|_t - y_o|_{(t-\Delta t)}}{\Delta t}\right)\frac{1}{\omega_d}e^{-\zeta\omega_n\Delta ti}\sin(\omega_d\Delta ti)$$

$$\hat{e} = e_o|_t \begin{bmatrix} 1 \\ 1 \\ \vdots \\ 1 \end{bmatrix} + (y_o|_t - u|_{(t-\Delta t)}k_p) \quad (51)$$

$$\begin{bmatrix} \left(1 - e^{-\zeta\omega_n\Delta t}\cos(\omega_d\Delta t) - \frac{\zeta\omega_n}{\omega_d}e^{-\zeta\omega_n\Delta t}\sin(\omega_d\Delta t)\right) \\ \left(1 - e^{-2\zeta\omega_n\Delta t}\cos(2\omega_d\Delta t) - \frac{\zeta\omega_n}{\omega_d}e^{-2\zeta\omega_n\Delta t}\sin(2\omega_d\Delta t)\right) \\ \vdots \\ \left(1 - e^{-N\zeta\omega_n\Delta t}\cos(N\omega_d\Delta t) - \frac{\zeta\omega_n}{\omega_d}e^{-N\zeta\omega_n\Delta t}\sin(N\omega_d\Delta t)\right) \end{bmatrix} -$$

$$\left(\frac{y_o|_t - y_o|_{(t-\Delta t)}}{\Delta t}\right)\frac{1}{\omega_d}\begin{bmatrix} e^{-\zeta\omega_n\Delta t}\sin(\omega_d\Delta t) \\ e^{-2\zeta\omega_n\Delta t}\sin(2\omega_d\Delta t) \\ \vdots \\ e^{-N\zeta\omega_n\Delta t}\sin(N\omega_d\Delta t) \end{bmatrix}$$

Using Eq. 51 as the error vector the equations in Eq. 52 for the future control actions can be written.

$$\Delta\hat{u} = \frac{1}{k_p^2}M^{-1}A^T\hat{e} \quad (52)$$

$$\Delta\hat{u} = \frac{e_o|_t}{k_p^2}M^{-1}A^T\begin{bmatrix} 1 \\ 1 \\ \vdots \\ 1 \end{bmatrix} + \frac{(y_o|_t - u|_{(t-\Delta t)}k_p)}{k_p^2}M^{-1}A^T \quad (53)$$

$$\begin{bmatrix} \left(1 - e^{-\zeta\omega_n\Delta t}\cos(\omega_d\Delta t) - \frac{\zeta\omega_n}{\omega_d}e^{-\zeta\omega_n\Delta t}\sin(\omega_d\Delta t)\right) \\ \left(1 - 3^{-2\zeta\omega_n\Delta t}\cos(2\omega_d\Delta t) - \frac{\zeta\omega_n}{\omega_d}e^{-2\zeta\omega_n\Delta t}\sin(2\omega_d\Delta t)\right) \\ \vdots \\ \left(1 - e^{-N\zeta\omega_n\Delta t}\cos(N\omega_d\Delta t) - \frac{\zeta\omega_n}{\omega_d}e^{-N\zeta\omega_n\Delta t}\sin(N\omega_d\Delta t)\right) \end{bmatrix}$$

$$\left(-\left(\frac{y_o|_t - y_o|_{(t-\Delta t)}}{\Delta t}\right)\frac{1}{k_p^2\omega_d}M^{-1}A^T\right)\begin{bmatrix} e^{-\zeta\omega_n\Delta t}\sin(\omega_d\Delta t) \\ e^{-2\zeta\omega_n\Delta t}\sin(2\omega_d\Delta t) \\ \vdots \\ e^{-N\zeta\omega_n\Delta t}\sin(N\omega_d\Delta t) \end{bmatrix}$$

Using the $\hat{d}_1$, $\hat{d}_2$ and $\hat{d}_3$ vectors, Eq. 53 can be rewritten for simplicity.

$$\Delta\hat{u} = \frac{e_o|_t}{k_p}\hat{d}_1 + \frac{(y_o|_t - u|_{(t-\Delta t)}k_p)}{k_p}\hat{d}_2 - \left(\frac{y_o|_t - y_o|_{(t-\Delta t)}}{\Delta t}\right)\frac{1}{k_p\omega_d}\hat{d}_3 \quad (54)$$

Since only the first element of the control action change vector is implemented on the plant the Eq. 54 can be reduced to the following.

$$\Delta u|_t = \quad (55)$$
$$\left(\frac{e_o|_t}{k_p}\right)d_1 + \left(\frac{(y_o|_t - u|_{(t-\Delta t)}k_p)}{k_p}\right)d_2 - \left(\left(\frac{y_o|_t - y_o|_{(t-\Delta t)}}{\Delta t}\right)\frac{1}{k_p\omega_d}\right)d_3$$

where:

$$\Delta u|_t = \Delta\hat{u}|_t(1)$$
$$d_1 = \hat{d}_1(1)$$
$$d_2 = \hat{d}_2(1)$$
$$d_3 = \hat{d}_3(1)$$

Rearranging Eq. 55 and replacing the control action change ($\Delta u|_t$) the following equation can be derived.

$$(u|_t - u|_{(t-\Delta t)}) + d_2 u|_{(t-\Delta t)} = \frac{d_1}{k_p}e|_t + \frac{d_2}{k_p}y|_t - \frac{d_3}{k_p\omega_d}\dot{y}|_t \quad (56)$$

$$\Delta t(1-d_2)\dot{u}|_t + d_2 u|_t = \frac{d_1}{k_p}e|_t + \frac{d_2}{k_p}y|_t - \frac{d_3}{k_p\omega_d}\dot{y}|_t \quad (57)$$

Taking the Laplace transform of Eq. 57

$$(\Delta t(1-d_2)s + d_2)U(s) = \frac{d_1}{k_p}E(s) - \left(\frac{d_3}{k_p\omega_d}s - \frac{d_2}{k_p}\right)Y(s) \quad (58)$$

Using the general equation for a second order system (Eq. 59) the equation Eq. 58 can be rearranged into a transfer function between the error and the control action.

$$\frac{Y(s)}{U(s)} = \frac{k_p\omega_n^2}{s^2 + 2\zeta\omega_n s + \omega_n^2} \quad (59)$$

$$(\Delta t(1-d_2)s + d_2)U(s) = \quad (60)$$
$$\frac{d_1}{k_p}E(s) - \left(\frac{d_3}{k_p\omega_d}s - \frac{d_2}{k_p}\right)\left(\frac{k_p\omega_n^2}{s^2 + 2\zeta\omega_n s + \omega_n^2}\right)U(s)$$

$$\left(\Delta t(1-d_2)s + d_2 + \left(\frac{\frac{\omega_n^2}{\omega_d}d_3 s - \omega_n^2 d_2}{s^2 + 2\zeta\omega_n s + \omega_n^2}\right)\right)U(s) = \frac{d_1}{k_p}E(s) \quad (61)$$

$$\frac{U(s)}{E(s)} = \frac{\frac{d_1}{k_p}(s^2 + 2\zeta\omega_n s + \omega_n^2)}{\Delta t(1-d_2)s^3 + (d_2 + 2\zeta\omega_n\Delta t(1-d_2))s^2 + \left(\omega_n^2\Delta t(1-d_2) + 2\zeta\omega_n d_2 + \frac{\omega_n^2}{\omega_d}d_3\right)s} \quad (62)$$

Converting the transfer function in Eq. 62 into discrete time will yield the control law for a second order Dynamic Matrix Controller.

$$u|_t = (b_0)e|_t + (b_1) \quad (63)$$
$$e|_{(t-\Delta t)} + (b_2)e|_{(t-2\Delta t)} - (a_1)u|_{(t-\Delta t)} - (a_2)u|_{(t-2\Delta t)} - (a_3)u|_{(t-3\Delta t)}$$

where:

-continued $$a_1 = -\left(\frac{\left(3 - d_2 + \left(4\zeta - 2\zeta d_2 + \frac{\omega_n}{\omega_d}d_3\right)\omega_n\Delta t + (1-d_2)\omega_n^2\Delta t^2\right)}{\left(1 + \left(2\zeta + \frac{\omega_n}{\omega_d}d_3\right)\omega_n\Delta t + (1-d_2)\omega_n^2\Delta t^2\right)}\right)$$

$$a_2 = \left(\frac{3 - 2d_2 + (1-d_2)2\zeta\omega_n\Delta t}{1 + \left(2\zeta + \frac{\omega_n}{\omega_d}d_3\right)\omega_n\Delta t + (1-d_2)\omega_n^2\Delta t^2}\right)$$

$$a_3 = -\left(\frac{1 - d_2}{1 + \left(2\zeta + \frac{\omega_n}{\omega_d}d_3\right)\omega_n\Delta t + (1-d_2)\omega_n^2\Delta t^2}\right)$$

$$b_0 = \frac{d_1}{k_p}\left(\frac{1 + 2\zeta\omega_n\Delta t + \omega_n^2\Delta t^2}{1 + \left(2\zeta + \frac{\omega_n}{\omega_d}d_3\right)\omega_n\Delta t + (1-d_2)\omega_n^2\Delta t^2}\right)$$

$$b_1 = -\frac{d_1}{k_p}\left(\frac{2 + 2\zeta\omega_n\Delta t}{1 + \left(2\zeta + \frac{\omega_n}{\omega_d}d_3\right)\omega_n\Delta t + (1-d_2)\omega_n^2\Delta t^2}\right)$$

$$b_2 = \frac{d_1}{k_p}\left(\frac{1}{1 + \left(2\zeta + \frac{\omega_n}{\omega_d}d_3\right)\omega_n\Delta t + (1-d_2)\omega_n^2\Delta t^2}\right)$$

4. First Order Plus Dead Time Controller Theory

This section presents the control theory derivation for a first order plus dead time system. The general transfer function for a first order system with dead time can be seen in Eq. 64

$$G(s) = \frac{k_p e^{-\theta s}}{\tau s + 1} \quad (64)$$

where:

$k_p$ System Gain $\theta$ System Dead Time $\tau$ System Time Constant,

Using the zero hold discrete model theory, Eq.64 can be rewritten into the discrete time domain. This equation (Eq. 65) is formulated assuming the control action (u|(t−θ)) will be constant for k time steps ahead.

$$\hat{y}|_{(t+k\Delta t)} = \alpha^k y_o|_t + k_p(1-\alpha^k)u|_{(t-\theta)} \quad (65)$$

where:

$\hat{y}|_t$ Plant output at time $t$ $u|_t$ System input at time $t$ $\alpha$ Constant $\left(e^{\frac{\Delta t}{\tau}}\right)$ $k$ an integer depicting a future time $\Delta t$ Time Step Using Eq. 65 the general form of a step test can be derived. The initial conditions are all zero and the control action will be a constant unity so the equation can be significantly simplified.

$$\hat{c}_i = \begin{cases} 0: & i < \frac{\theta}{\Delta t} \\ k_p(1-\alpha^i): & i \geq \frac{\theta}{\Delta t} \end{cases} \quad (66)$$

where:

$\hat{c}_i$ $i^{th}$ Value of the Step Test

This step test data is then used to populate the dynamic matrix. Since the gain is in every term it can be factored out of the matrix.

$$A = k_p \begin{bmatrix} 0 & 0 & \cdots & 0 \\ \vdots & \vdots & \vdots & \vdots \\ (1-\alpha^1) & 0 & \cdots & 0 \\ (1-\alpha^2) & (1-\alpha^1) & \cdots & 0 \\ \vdots & \vdots & \ddots & \vdots \\ (1-\alpha^{N-n_k}) & (1-\alpha^{N-n_k-1}) & \cdots & (1-\alpha^{N-n_u-n_k+1}) \end{bmatrix} \quad (67)$$

where: $N$ Prediction horizon length $n_u$ Control horizon length $n_k$ Dead Time Steps $\left(n_k = \frac{\theta}{\Delta t}\right)$(Rounded)

Using this dynamic matrix and its transpose the next part of the DMC control law can be computed. To reduce high changes in the control actions a move suppression factor is used in Dynamic Matrix Control. This factor is multiplied by the diagonal in the A T A matrix.

$$(A^T A - \hat{\lambda}I) = k_p^2 \begin{bmatrix} \lambda\sum_{i=1}^{N-n_k}(1-\alpha^i)^2 & \sum_{i=1}^{N-n_k-1}(1-\alpha^i)(1-\alpha^{i+1}) & \cdots & \sum_{i=1}^{N-n_k-n_u+1}(1-\alpha^i)(1-\alpha^{i+n_u-1}) \\ \sum_{i=1}^{N-n_k-1}(1-\alpha^i)(1-\alpha^{i+1}) & \lambda\sum_{i=1}^{N-n_k-1}(1-\alpha^i)^2 & \cdots & \sum_{i=1}^{N-n_k-n_u+1}(1-\alpha^i)(1-\alpha^{i+n_u-2}) \\ \vdots & \vdots & \ddots & \vdots \\ \sum_{i=1}^{N-n_k-n_u+1}(1-\alpha^i)(1-\alpha^{i+n_u-1}) & \sum_{i=1}^{N-n_k-n_u+1}(1-\alpha^i)(1-\alpha^{i+n_u-2}) & \cdots & \lambda\sum_{i=1}^{N-n_k-n_u+1}(1-\alpha^i)^2 \end{bmatrix} \quad (68)$$

where: $\lambda$ Move suppression factor

In the control law the next step is to invert the matrix but with the plant gain factored out of the matrix the following inversion identity can be used to keep the gain separate from the control law.

$$(kA)^{-1} = \frac{1}{k} A^{-1} \quad (69)$$

Therefore, $$(A^T A - \hat{\lambda} I)^{-1} = \frac{1}{k_p^2} M^{-1} \quad (70)$$

$$M = \begin{bmatrix} \lambda \sum_{i=1}^{N-n_k} (1-\alpha^i)^2 & \sum_{i=1}^{N-n_k-1} (1-\alpha^i)(1-\alpha^{i+1}) & \cdots & \sum_{i=1}^{N-n_k-n_u+1} (1-\alpha^i)(1-\alpha^{i+n_u-1}) \\ \sum_{i=1}^{N-n_k-1} (1-\alpha^i)(1-\alpha^{i+1}) & \lambda \sum_{i=1}^{N-n_k-1} (1-\alpha^i)^2 & \cdots & \sum_{i=1}^{N-n_k-n_u+1} (1-\alpha^i)(1-\alpha^{i+n_u-2}) \\ \vdots & \vdots & \ddots & \vdots \\ \sum_{i=1}^{N-n_k-n_u+1} (1-\alpha^i)(1-\alpha^{i+n_u-1}) & \sum_{i=1}^{N-n_k-n_u+1} (1-\alpha^i)(1-\alpha^{i+n_u-2}) & \cdots & \lambda \sum_{i=1}^{N-n_k-n_u+1} (1-\alpha^i)^2 \end{bmatrix} \quad (71)$$

The second half of the control law is $A^T \hat{e}$.

$$A^T \hat{e} = k_p \begin{bmatrix} 0 & \cdots & (1-\alpha^1) & (1-\alpha^2) & \cdots & (1-\alpha^{N-n_k}) \\ 0 & \cdots & 0 & (1-\alpha^2) & \cdots & (1-\alpha^{N-n_k-1}) \\ \vdots & \vdots & \vdots & \vdots & \vdots & \vdots \\ 0 & \cdots & 0 & 0 & \cdots & (1-\alpha^{N-n_k-n_u+1}) \end{bmatrix} \begin{bmatrix} \hat{e}_1 \\ \hat{e}_2 \\ \vdots \\ \hat{e}_N \end{bmatrix} \quad (72)$$

$$A^T \hat{e} = k_p \begin{bmatrix} \sum_{i=1}^{N-n_k} (1-\alpha^i) \hat{e}_{i+n_k-1} \\ \sum_{i=1}^{N-n_k-1} (1-\alpha^i) \hat{e}_{i+n_k-1} \\ \vdots \\ \sum_{i=1}^{N-n_k-n_u+1} (1-\alpha^i) \hat{e}_{i+n_k-1} \end{bmatrix} \quad (73)$$

From Eq. 73 it can be seen that the first $n_k$ elements of the error vector are not used in the calculation of the next control action. This means the prediction vector is also only significant after $n_k$ steps. Using this fact the prediction vector formulation will be identical to the formulation of the prediction vector for the first order system without dead time. From Eq. 26 the formulation of the error vector can be determined.

$$\hat{e} = e_{+n_k} \begin{bmatrix} N.R. \\ \vdots \\ 1 \\ 1 \\ \vdots \\ 1 \end{bmatrix} - dy_{ss(+n_k)} \begin{bmatrix} N.R. \\ \vdots \\ 1-\alpha \\ 1-\alpha^2 \\ \vdots \\ 1-\alpha^{N-n_k} \end{bmatrix} \quad (74)$$

where: *N.R.* Not Relevant $(+n_k)$ Indexing $n_k$ Steps in the Future

Using this new equation for the error vector the and the dynamic matrix control law an equation can be formulated for the change in the control action.

$$\Delta \hat{u} = \frac{1}{k_p^2} M^{-1} A^T \hat{e} \quad (75)$$

$$\Delta \hat{u} = \frac{e_{+n_k}}{k_p^2} M^{-1} A^T \begin{bmatrix} N.R. \\ \vdots \\ 1 \\ 1 \\ \vdots \\ 1 \end{bmatrix} - \frac{dy_{ss(+n_k)}}{k_p^2} M^{-1} A^T \begin{bmatrix} N.R. \\ \vdots \\ 1-\alpha \\ 1-\alpha^2 \\ \vdots \\ 1-\alpha^{N-n_k} \end{bmatrix} \quad (76)$$

Using the $\hat{w}$ and $\hat{z}$ vector the equation can be rewritten.

$$\Delta \hat{u} = \frac{e_{+n_k}}{k_p} W - \frac{dy_{ss(+n_k)}}{k_p} Z \quad (77)$$

where: $\hat{z} = M^{-1} \begin{bmatrix} \sum_{i=1}^{N-n_k} (1-\alpha^i)^2 \\ \sum_{i=1}^{N-n_k-1} (1-\alpha^i)(1-\alpha^{i+1}) \\ \vdots \\ \sum_{i=1}^{N-n_k-n_u+1} (1-\alpha^i)(1-\alpha^{i+n_u-1}) \end{bmatrix}$ $$\hat{w} = M^{-1} \begin{bmatrix} \sum_{i=1}^{N-n_k} (1-\alpha^i) \\ \sum_{i=1}^{N-n_k-1} (1-\alpha^i) \\ \vdots \\ \sum_{i=1}^{N-n_k-n_u+1} (1-\alpha^i) \end{bmatrix}$$

Only the first element of the control action change vector will be used so the equation can be reduced.

$$\Delta u = \frac{\hat{w}_1}{k_p} e_{(+n_k)} - \frac{\hat{z}_1}{k_p} dy_{ss(+n_k)} \quad (78)$$

where: $\Delta u = \Delta \hat{u}_1$ $$u|_t = (b_0)e|_{(t+n_k \Delta t)} + (b_1)e|_{(t+(n_k-1)\Delta t)} - (a_1)u|_{(t-\Delta t)} - (a_2)u|_{(t-2\Delta t)} \quad (79)$$

where
$$\frac{}{Y(s)}: a_1 = -\frac{1+\alpha}{1+\hat{z}_1 \alpha}$$

$$a_2 = \frac{\alpha}{1+\hat{z}_1 \alpha}$$

$$b_0 = \frac{\hat{w}_1}{k_p(1+\hat{z}_1\alpha)}$$

$$b_1 = -\frac{\hat{w}_1 \alpha}{k_p(1+\hat{z}_1\alpha)}$$

This control law is the same as the one for the first order plant (Eq. 30) except for the e $(+n_k)$ and dy ss$(+n_k)$ are delayed by $n_k$ time steps. Using the same theory as for the general first order formulation the control law for the first order plus dead time can be written.

In the Eq. 79 there are some future errors ($e_{t+nk}$ and $e|_{(t-\Delta t+nk)}$) which are required to calculate the next control action. Using the zero order hold discrete equation for a first order system, Eq. 4, the future error can be written in terms of the current process or plant value, the setpoint and last $n_k$ control actions.

$$\hat{e}|_{(t+n_k \Delta t)} = r - \alpha^{n_k} y_o|_t \quad (80)$$

$$-k_p(1-\alpha^{n_k})u|_{(t-n_k\Delta t)} - \sum_{i=1}^{n_k-1} k_p(1-\alpha^i)(u|_{(t-i\Delta t)} - u|_{(t-(i+1)\Delta t)})$$

5. General Linear System Controller Theory

With reference to FIG. 1, in this section the general linear control theory is derived. It is similar to the methodology used in the first order derivation but it allows any linear system to be used. According to one embodiment of the present invention, in step 4, transform a model into a weighted sequence, the model provided in step 2 can be used to algebraically describe each element in a unit step test of the system being modelled. With each of these individual equations, the dynamic matrix can be populated with solely algebraic expressions. The form that will be used for the model provided in step 2 is as follows.

$$\frac{Y(s)}{U(s)} = \frac{b_o + b_1 s + \cdots + b_{m_b} s^{m_b}}{1 + a_1 s + \cdots + a_{n_a} s^{n_a}} \quad (81)$$

This formulation assumes the model is in its reduced form such that $m_b$ is less than $n_a$. From this state the model can be reduced to a series of first order equations, where the gain ($k_i$) and the time constant ($\tau_i$) can be either real or complex values.

$$\frac{Y(s)}{U(s)} = \sum_{i=1}^{n_a} \frac{k_i}{\tau_i s + 1} \quad (82)$$

In step 3, generate equation for step test, using the zero order hold discrete model for a first order system (Eq. 4) the general linear zero order hold model can be created. The initial conditions are all zero and the control action will be constant at one so the equation can be significantly simplified.

$$\hat{c}_j = \sum_{i=1}^{n_a} k_i(1-\alpha_i^j) \quad (83)$$

where: $\alpha_i$ Constant$\left(e^{\frac{-\Delta t}{\tau_i}}\right)$

In step 6, populate dynamic matrix, this step test data is then used to populate the dynamic matrix.

$$A = \begin{bmatrix} \hat{c}_1 & 0 & \cdots & 0 \\ \hat{c}_2 & \hat{c}_1 & \cdots & 0 \\ \vdots & \vdots & \ddots & \vdots \\ \hat{c}_N & \hat{c}_{N-1} & \cdots & \hat{c}_{N-nu+1} \end{bmatrix} \quad (84)$$

where: $N$ Prediction horizon length $nu$ Control horizon length

Using this dynamic matrix and its transpose the next part of the DMC control law can be computed. To reduce high changes in the control actions a move suppression factor is used in Dynamic Matrix Control. This factor is multiplied by the diagonals in the $A^T A$ matrix $$(A^T A - \hat{\lambda} I) = \begin{bmatrix} \lambda \sum_{j=1}^{N} (\hat{c}_j)^2 & \sum_{j=1}^{N-1} (\hat{c}_j)(\hat{c}_{j+1}) & \cdots & \sum_{j=1}^{N-nu+1} (\hat{c}_j)(\hat{c}_{j+nu-1}) \\ \sum_{j=1}^{N-1} (\hat{c}_j)(\hat{c}_{j+1}) & \lambda \sum_{j=1}^{N-1} (\hat{c}_j)^2 & \cdots & \sum_{j=1}^{N-nu+1} (\hat{c}_j)(\hat{c}_{j+nu-2}) \\ \vdots & \vdots & \ddots & \vdots \\ \sum_{j=1}^{N-nu+1} (\hat{c}_j)(\hat{c}_{j+nu-1}) & \sum_{j=1}^{N-nu+1} (\hat{c}_j)(\hat{c}_{j+nu-2}) & \cdots & \lambda \sum_{j=1}^{N-nu+1} (\hat{c}_j)^2 \end{bmatrix} \quad (85)$$

where: $\lambda$ Move suppression factor
Therefore, $$(A^T A - \hat{\lambda} I)^{-1} = M^{-1} \quad (86)$$

$$M = \begin{bmatrix} \lambda \sum_{j=1}^{N} (\hat{c}_j)^2 & \sum_{j=1}^{N-1} (\hat{c}_j)(\hat{c}_{j+1}) & \cdots & \sum_{j=1}^{N-nu+1} (\hat{c}_j)(\hat{c}_{j+nu-1}) \\ \sum_{j=1}^{N-1} (\hat{c}_j)(\hat{c}_{j+1}) & \lambda \sum_{j=1}^{N-1} (\hat{c}_j)^2 & \cdots & \sum_{j=1}^{N-nu+1} (\hat{c}_{jj})(\hat{c}_{j+nu-1}) \\ \vdots & \vdots & \ddots & \vdots \\ \sum_{j=1}^{N-n_u+1} (\hat{c}_j)(\hat{c}_{j+nu-1}) & \sum_{j=1}^{N-n_u+1} (\hat{c}_j)(\hat{c}_{j+nu-2}) & \cdots & \lambda \sum_{j=1}^{N-nu+1} (\hat{c}_j)^2 \end{bmatrix} \quad (87)$$

$$\hat{e} = \hat{r} - \hat{y} \quad (88)$$

For this application of the controller the set point vector ($\hat{r}$) is going to be represented by a constant value.

$$\hat{e} = r - \hat{y} \quad (89)$$

In step 4, predicted response vector, also from the discrete time model, each element of the predicted response of the system could be generated from different algebraic equations. The prediction vector can then be formulated using the time derivation of the system $$\hat{y}_j|_t = \sum_{i=1}^{n_a} y_{oi}|_t \alpha_i^j + u|_{(t-\Delta t)} k_i (1 - \alpha_i^j) \quad (90)$$

Adding the control action dynamics and current measured dynamics together allows the equation to be simplified.

$$\hat{y}_j|_t = \sum_{i=1}^{n_a} (u|_{(t-\Delta t)} k_i - y_{oi}|_t)(1 - \alpha_i^j) + \sum_{i=1}^{n_a} y_{oi}|_t \quad (91)$$

In step 7, with input from step 5, predicted error vector, replacing the prediction vector in Eq. 89 with Eq. 91 the error vector can be written in terms of the current error value ($e_o = r - y_o$).

$$\hat{e} = e_o - \sum_{i=1}^{n_a} (u|_{(t-\Delta t)} k_i - y_{oi}|_t)(\lambda - \alpha_i^j) \quad (92)$$

Rearranging Eq.92 allows the error vector to be written as two separate vectors.

$$\hat{e} = e_o \begin{bmatrix} 1 \\ 1 \\ \vdots \\ 1 \end{bmatrix} + \sum_{i=1}^{n_a} \left( (y_{oi}|_t - u|_{(t-\Delta t)} k_i) \begin{bmatrix} (1 - \alpha_i) \\ (1 - \alpha_i^2) \\ \vdots \\ (1 - \alpha_i^N) \end{bmatrix} \right) \quad (93)$$

In step 8, combine in control law, using this new equation for the error vector and the dynamic matrix control law, an equation can be formulated for the change in the control action.

$$\Delta \hat{u} = M^{-1} A^T \hat{e} \quad (94)$$

$$\Delta \hat{u} = e_o M^{-1} A^T \begin{bmatrix} 1 \\ 1 \\ \vdots \\ 1 \end{bmatrix} + \sum_{i=1}^{n_a} \left( (y_{oi}|_t - u|_{(t-\Delta t)} k_i) M^{-1} A^T \begin{bmatrix} (1 - \alpha_i) \\ (1 - \alpha_i^2) \\ \vdots \\ (1 - \alpha_i^N) \end{bmatrix} \right) \quad (95)$$

In step 9, reduce control law, the control law can then be reduced to its minimum form, which would leave the next control action to be a function of the system parameters, the past errors, and the past control actions. Using the $\hat{d}_1$ and $\hat{d}_{2i}$ vector the equation can be rewritten.

$$\Delta \hat{u} = e_o \hat{d}_1 + \sum_{i=1}^{n_2} (y_{oi}|_t - u|_{(t-\Delta t)} k_i) \hat{d}_{2i} \quad (96)$$

$$\text{where: } d_1 = M^{-1}A^T \begin{bmatrix} 1 \\ 1 \\ \vdots \\ 1 \end{bmatrix}$$

$$\hat{d}_{2i} = M^{-1}A^T \begin{bmatrix} (1-\alpha_i) \\ (1-\alpha_i^2) \\ \vdots \\ (1-\alpha_i^N) \end{bmatrix}$$

Since only the first element of the control action change vector is implemented on the plant the Eq. 96 can be reduced to the following.

$$\Delta u = e_o d_1 - u|_{(t-\Delta t)} d_3 + \sum_{\tau=1}^{n_2} y_{oi}|_t d_{2i} \quad (97)$$

where: $\Delta u = \Delta \hat{u}(1)$ $d_1 = \hat{d}_1(1)$ $d_{2i} = \hat{d}_{2i}(1)$ $d_3 = \sum_{i=1}^{n_a} k_i d_{2i}$ Rearranging Eq. 97 and replacing the control action change ($\Delta u$) the following equation can be derived.

$$(u|_t - u|_{(t-\Delta t)}) + d_3 u|_{(t-\Delta t)} = d_1 e|_t + \sum_{i=1}^{n_a} d_{2i} y_i|_t \quad (98)$$

$$\Delta t(1-d_3)\dot{u}|_t + d_3 u|_t = d_1 e|_t + \sum_{i=1}^{n_a} d_{2i} y_i|_t \quad (99)$$

Taking the Laplace transform of Eq 99

$$(\Delta t(1-d_3)s + d_3)U(s) = d_1 E(s) + \sum_{i=1}^{n_a} d_{2i} Y_i(s) \quad (100)$$

Using the general equation for a first order system (Eq. 101) the equation Eq. 100 can be rearranged into a transfer function between the error and the control action.

$$\frac{Y_i(s)}{U(s)} = \frac{k_i}{\tau_i s + 1} \quad (101)$$

$$(\Delta t(1-d_3)s + d_3)U(s) = d_i E(s) + \sum_{i=1}^{n_a} d_{2i}\left(\frac{k_i}{\tau_i s + 1}\right)U(s) \quad (102)$$

$$\left(\Delta t(1-d_3)s + d_3 - \sum_{i=1}^{n_a} \frac{k_i d_{2i}}{\tau_i s + 1}\right)U(s) = d_1 E(s) \quad (103)$$

$$\frac{U(s)}{E(s)} = \frac{d_1\left(\prod_{i=1}^{n_a} \tau_i s + 1\right)}{(\Delta t(1-d_3)s + d_3)\left(\prod_{i=1}^{n_a} \tau_i s + 1\right) - \sum_{j=1}^{n_a}\left((k_j d_{2j})\left(\prod_{i=1}^{j-1} \tau_i s + 1\right)\left(\prod_{i=j+1}^{n_a} \tau_i s + 1\right)\right)} \quad (104)$$

In step 10, coefficients for input-output discrete control law, converting the transfer function seen in Eq. 104 into discrete time will yield the control law for a general linear system. Since the model parameters are constant, this single discrete equation would have constant coefficients which are all calculated before the controller is running, such that the amount of computational time required in each control cycle is reduced.

6. General Linear MIMO System Controller Theory

In this section the theory for the general linear multiple input and multiple output system will be derived and presented. This will start with the form of a general linear MIMO system.

$$\frac{Y_w(s)}{U_v(s)} = \frac{b_{w,v,0} + b_{w,v,1}s + \ldots + b_{w,v,m_{b(w,v)}}s^{m_{b(w,v)}}}{1 + a_{w,v,1}s + \ldots + a_{w,v,n_{a(w,v)}}s^{n_{a(w,v)}}} \quad (105)$$

In this equation the w is an index that represents the different outputs of the MIMO system and the v is an index of the inputs of the system. This formulation assumes the model is in its reduced form such that $m_{b(w,v)}$ is less than $n_{a(w,v)}$. From this state the model can be reduced to a series of first order equations where the gain ($k_{w,v,i}$) and the time constant ($\tau_{w,v,i}$) can be either real or complex values.

$$\frac{Y_w(s)}{U_v(s)} = \sum_{i=1}^{n_{a(w,v)}} \frac{k_{w,v,i}}{\tau_{w,v,i}s + 1} \quad (106)$$

Using the zero hold discrete model a discrete equation for the step response can be generated using Eq. 106. The initial conditions are all zero and the control action will be constant at one so the equation can be significantly simplified.

$$\hat{c}_{(w,v),j} = \sum_{i=1}^{n_{a(w,v)}} k_{(w,v,i)}(1 - \alpha_{(w,v,i)}^j) \quad (107)$$

This step test data is then used to populate a dynamic matrix.

$$A = \begin{bmatrix} G_{(1,1)} & G_{(1,2)} & \ldots & G_{(1,N_v)} \\ G_{(2,1)} & G_{(2,2)} & \ldots & G_{(2,N_v)} \\ \vdots & \vdots & \ddots & \vdots \\ G_{(N_w,1)} & G_{(N_w,2)} & \ldots & G_{(N_w,N_v)} \end{bmatrix} \quad (108)$$

-continued $$G_{(w,v)} = \begin{bmatrix} \hat{c}_{(w,v),1} & 0 & \cdots & 0 \\ \hat{c}_{(w,v),2} & \hat{c}_{(w,v),1} & \cdots & 0 \\ \vdots & \vdots & \ddots & \vdots \\ \hat{c}_{(w,v),N} & \hat{c}_{(w,v),(N-1)} & \cdots & \hat{c}_{(w,v),(N-n_u+1)} \end{bmatrix} \quad (109)$$

where: $N$ Prediction horizon length
$n_u$ Control horizon length
$N_w$ Number of outputs
$N_v$ Number of inputs Using this dynamic matrix and its transpose the next part of the control law can be computed. To reduce high changes in the control actions a move suppression factor is used in Dynamic Matrix Control. This factor is multiplied by the diagonals in the $A^T A$ matrix $$(A^T A - \hat{\lambda} I) = \begin{bmatrix} H_{1,1} & H_{1,2} & \cdots & H_{1,N_v} \\ H_{2,1} & H_{2,2} & \cdots & H_{2,N_v} \\ \vdots & \vdots & \ddots & \vdots \\ H_{N_v,1} & H_{N_v,2} & \cdots & H_{N_v,N_v} \end{bmatrix} = M \quad (110)$$

Where H is equal to Eq. 111 if $v_1$ not equal $v_2$, if they are equal then H is shown in Eq. 112 and $\lambda$ is the move suppression factor.

$$H_{N_v,N_v} = \begin{bmatrix} \sum_{w=1}^{N_w}\sum_{j=1}^{N}(\hat{c}_{(w,v_1),j})(\hat{c}_{(w,v_2),j}) & \sum_{w=1}^{N_w}\sum_{j=1}^{N-1}(\hat{c}_{(w,v_1),j})(\hat{c}_{(w,v_2),(j+1)}) & \cdots & \sum_{w=1}^{N_w}\sum_{j=1}^{N-n_u+1}(\hat{c}_{(w,v_1),j})(\hat{c}_{(w,v_2),(j+n_u-1)}) \\ \sum_{w=1}^{N_w}\sum_{j=1}^{N}(\hat{c}_{(w,v_1),(j+1)})(\hat{c}_{(w,v_2),j}) & \sum_{w=1}^{N_w}\sum_{j=1}^{N-1}(\hat{c}_{(w,v_1),j})(\hat{c}_{(w,v_2),j}) & \cdots & \sum_{w=1}^{N_w}\sum_{j=1}^{N-n_u+1}(\hat{c}_{(w,v_1),j})(\hat{c}_{(w,v_2),(j+n_u-2)}) \\ \vdots & \vdots & \ddots & \vdots \\ \sum_{w=1}^{N_w}\sum_{j=1}^{N-n_u+1}(\hat{c}_{(w,v_1),(j+n_u-1)})(\hat{c}_{(w,v_2),j}) & \sum_{w=1}^{N_w}\sum_{j=1}^{N-n_u+1}(\hat{c}_{(w,v_1),(j+n_u-1)})(\hat{c}_{(w,v_2),j}) & \cdots & \sum_{w=1}^{N_w}\sum_{j=1}^{N-n_u+1}(\hat{c}_{(w,v_1),j})(\hat{c}_{(w,v_2),j}) \end{bmatrix} \quad (111)$$

$$H_{v_1,v_2} = \begin{bmatrix} \lambda\sum_{w=1}^{N_w}\sum_{j=1}^{N}(\hat{c}_{(w,v_1),j})^2 & \sum_{w=1}^{N_w}\sum_{j=1}^{N-1}(\hat{c}_{(w,v_1),j})(\hat{c}_{(w,v_2),(j+1)}) & \cdots & \sum_{w=1}^{N_w}\sum_{j=1}^{N-1}(\hat{c}_{(w,v_1),j})(\hat{c}_{(w,v_2),(j+n_u-1)}) \\ \sum_{w=1}^{N_w}\sum_{j=1}^{N}(\hat{c}_{(w,v_1),(j+1)})(\hat{c}_{(w,v_2),j}) & \lambda\sum_{w=1}^{N_w}\sum_{j=1}^{N}(\hat{c}_{(w,v_1),j})^2 & \cdots & \sum_{w=1}^{N_w}\sum_{j=1}^{N-1}(\hat{c}_{(w,v_1),j})(\hat{c}_{(w,v_2),(j+n_u-2)}) \\ \vdots & \vdots & \ddots & \vdots \\ \sum_{w=1}^{N_w}\sum_{j=1}^{N-n_u+1}(\hat{c}_{(w,v_1),(j+n_u-1)})(\hat{c}_{(w,v_2),j}) & \sum_{w=1}^{N_w}\sum_{j=1}^{N-n_u+1}(\tilde{c}_{(w,v_1),(j+n_u-1)})(\tilde{c}_{(w,v_2),j}) & \cdots & \lambda\sum_{w=1}^{N_w}\sum_{j=1}^{N-n_u+1}(\hat{c}_{(w,v_1),j})^2 \end{bmatrix} \quad (112)$$

The second half of the control law is $A^T \hat{e}$ $$\hat{e} = \begin{bmatrix} \hat{e}_1 \\ \hat{e}_2 \\ \vdots \\ \hat{e}_{N_w} \end{bmatrix} = \begin{bmatrix} \hat{r}_1 - \hat{y}_1 \\ \hat{r}_2 - \hat{y}_2 \\ \vdots \\ \hat{r}_{N_w} - \hat{y}_{N_w} \end{bmatrix} \quad (113)$$

With the set point vector ($\hat{r}$ w) being a vector of a constant value, it can be represented as a single value for each of the different outputs.

$$\hat{e}_w = r_w - \hat{y}_w \quad (114)$$

The prediction vector for each of the outputs can then be formulated using the time derivation of the system $$\hat{y}_{(w),j}|_t = \sum_{v=1}^{N_v} \sum_{i=1}^{N_{a(w,v)}} y_{o(w,v,i)}|_t \alpha_{(w,v,i)}^j + u_v|_{(t-\Delta t)} k_{(w,v,i)}(1 - \alpha_{(w,v,i)}^j) \quad (115)$$

Adding the control action dynamics and current measured dynamics together allows the equation to be simplified.

$$\hat{y}_{(w),j}|_t = \sum_{v=1}^{N_v} \sum_{i=1}^{N_{a(w,v)}} (u_v|_{(t-\Delta t)} k_{(w,v,i)} - y_{o(w,v,i)}|_t)(1 - \alpha_{(w,v,i)}^j) + \sum_{v=1}^{N_v} \sum_{i=1}^{N_{a(w,v)}} y_{o(w,v,i)}|_t \quad (116)$$

Replacing the prediction vector in Eq. 114 with Eq. 116 the error vector can be written in terms of the current error value $$\left( y_{o(w)} = \sum_{v=1}^{N_v} \sum_{i=1}^{N_{a(w,v)}} y_{o(w,v,i)} \right) (e_{o(w)} = r_w - y_{o(w)}). \quad (117)$$

$$\hat{e}_w = e_{o(w)}|_t - \sum_{v=1}^{N_v} \sum_{i=1}^{N_{a(w,v)}} (u_v|_{(t-\Delta t)} k_{(w,v,i)} - y_{o(w,v,i)}|_t)(1 - \alpha_{(w,v,i)}^j)$$

Rearranging Eq.117 allows the error vector to be written as two separate vectors.

$$\hat{e}_w = \qquad (118)$$

$$e_{o(w)}|_t \begin{bmatrix} 1 \\ 1 \\ \vdots \\ 1 \end{bmatrix} + \sum_{v=1}^{N_y} \sum_{i=1}^{N_{a(w,v)}} \left( (y_{o(w,v,i)}|_t - u_v|_{(t-\Delta t)} k_{(w,v,i)}) \begin{bmatrix} (1-\alpha_{(w,v,i)}) \\ (1-\alpha^2_{(w,v,i)}) \\ \vdots \\ (1-\alpha^N_{(w,v,i)}) \end{bmatrix} \right)$$

Using the error equation (Eq. 118) the entire control law can be written in known terms.

$$\Delta \hat{u} = M^{-1} A^T \hat{e} \qquad (119)$$

$$\Delta \hat{u} = \sum_{w=1}^{N_w} \Delta \hat{u}_w = \sum_{w=1}^{N_w} M^{-1} A_w^T \hat{e}_w \qquad (120)$$

$$A_w = [G_{(w,1)} \; G_{(w,2)} \; \ldots \; G_{(w,N_y)}] \qquad (121)$$

$$\Delta \hat{u} = \qquad (122)$$

$$\sum_{w=1}^{N_w} e_{o(w)}|_t M^{-1} A_w^T \begin{bmatrix} 1 \\ 1 \\ \vdots \\ 1 \end{bmatrix} \sum_{w=1}^{N_w} \sum_{v=1}^{N_y} \sum_{i=1}^{N_{a(w,v)}} \left( (y_{o(w,v,i)}|_t - u_v|_{(t-\Delta t)} k_{(w,v,i)}) \right)$$

$$M^{-1} A_w^T \begin{bmatrix} (1-\alpha_{(w,v,i)}) \\ (1-\alpha^2_{(w,v,i)}) \\ \vdots \\ (1-\alpha^N_{(w,v,i)}) \end{bmatrix}$$

Using the $\hat{d}_w$ and $\hat{q}_{(w,v),i}$ vectors the equation can be rewritten.

$$\Delta \hat{u} = \sum_{w=1}^{N_w} e_{o(w)}|_t \hat{d}_w + \sum_{w=1}^{N_w} \sum_{v=1}^{N_y} \sum_{i=1}^{N_{a(w,v)}} (y_{o(w,v,i)}|_t - u_v|_{(t-\Delta t)} k_{(w,v,i)}) \hat{q}_{(w,v),i} \qquad (123)$$

$$\text{where: } \hat{d}_w = M^{-1} A_w^T \begin{bmatrix} 1 \\ 1 \\ \vdots \\ 1 \end{bmatrix}$$

$$\hat{q}_{(w,v),i} = M^{-1} A_w^T \begin{bmatrix} (1-\alpha_{(w,v,i)}) \\ (1-\alpha^2_{(w,v,i)}) \\ \vdots \\ (1-\alpha^N_{(w,v,i)}) \end{bmatrix}$$

Since only the first element of the control action change vector is implemented on the plant the Eq. 123 can be reduced to the following.

$$u_{v_p}|_t = \sum_{w=1}^{N_w} d_{(w,v_p)} e_{o(w)}|_t \sum_{v=1}^{N_y} kq_{(v,v_p)} u_v|_{(t-\Delta t)} \qquad (124)$$

$$+ \sum_{w=1}^{N_w} \sum_{v=1}^{N_y} \sum_{i=1}^{N_{a(w,v)}} y_{o(w,v,i)}|_t q_{(w,v,i,v_p)}$$

where: $u_{v_p} = \Delta \hat{u}(1 + (v_p - 1)n_u) + u_{v_p}|_{(t-\Delta t)}$ $$d_{(w,v_p)} = \hat{d}_w(1 + (v_p - 1)n_u)$$

$$q_{(w,v,i,v_p)} = \hat{q}_{(w,v),i}(1 + (v_p - 1)n_u)$$

$$kq_{(v,v_p)} = \begin{cases} 1 - \sum_{w=1}^{N_w} \sum_{i=1}^{N_{a(w,v)}} k_{(w,v,i)} q_{(w,v,i,v_p)}, & v = v_p \\ -\sum_{w=1}^{N_w} \sum_{i=1}^{N_{a(w,v)}} k_{(w,v,i)} q_{(w,v,i,v_p)}, & \text{otherwise} \end{cases}$$

As the $y_{o(w,v,i)}|_t$ are the current outputs of the submodels there has to be a mapping from them to the actual outputs. Using the known relationship in Eq. 115 the mapping can be formulated so the $q_{(w,v,i,v_p)}$ variables can be formulated into parameters that will be multiplied to the $y_{o(w)}|_{t-n\Delta t}$ and $u_{v_p}|_{t-n\Delta t}$.

7. Linear Alternative Form Controller Theory

In some systems there are dynamics that can be induced on the output that not related to the input of the system so they need modeled separately. An example of where this type of model would be used is in the linearizion of a non-linear system at a series of operating positions. Eq. 125 show the transfer function form of the model while Eq. 126 shows how it could be broken down into a series of first order systems.

$$Y(s) = \frac{b_o + b_1 s + \ldots + b_{m_b} s^{m_b}}{1 + a_1 s + \ldots + a_{n_a} s^{n_a}} U(s) + \frac{c_o + c_1 s + \ldots + c_{m_c} s^{m_c}}{1 + a_1 s + \ldots + a_{n_a} s^{n_a}} \qquad (125)$$

$$Y(s) = \sum_{i=1}^{n_1} \frac{k_i}{\tau_i s + 1} U(s) + \sum_{i=1}^{n_2} \frac{k_{di}}{\tau_i s + 1} \qquad (126)$$

With the model being slightly different, to capture the step test dynamics the different between a step input and not step input has to be used. This can be seen in Eq. 127. The initial conditions are all zero and the control action will be constant at one so the equation can be significantly simplified into Eq. 128.

$$\hat{c} = \frac{sim f(u + dv) - sim f(u)}{dv}, \text{ where: } dv = 1 \qquad (127)$$

$$\hat{c}_j = \sum_{i=1}^{n_1} k_i (1 - \alpha_i^j) \qquad (128)$$

Using these step dynamics similar to the other systems the inverse of the M can be constructed.

$$(A^T A - \Lambda)^{-1} = M^{-1} \tag{129}$$

$$M = \begin{bmatrix} \lambda \sum_{j=1}^{N}(\hat{c}_j)^2 & \sum_{j=1}^{N-1}(\hat{c}_j)(\hat{c}_{j+1}) & \cdots & \sum_{j=1}^{N-n_u+1}(\hat{c}_j)(\hat{c}_{j+n_u-1}) \\ \sum_{j=1}^{N-1}(\hat{c}_j)(\hat{c}_{j+1}) & \lambda \sum_{j=1}^{N}(\hat{c}_j)^2 & \cdots & \sum_{j=1}^{N-n_u+1}(\hat{c}_{jj})(\hat{c}_{j+n_u-2}) \\ \vdots & \vdots & \ddots & \vdots \\ \sum_{j=1}^{N-n_u+1}(\hat{c}_j)(\hat{c}_{j+n_u-1}) & \sum_{j=1}^{N-n_u+1}(\hat{c}_j)(\hat{c}_{j+n_u-2}) & \cdots & \lambda \sum_{j=1}^{N-n_u+1}(\hat{c}_j)^2 \end{bmatrix} \tag{130}$$

The second half of the control law is $A^T \hat{e}$ $$\hat{e} = \hat{r} - \hat{y} \tag{131}$$

With the set point vector ($\hat{r}$) being a vector of a constant value it can be represented as a single value.

$$\hat{e} = r - \hat{y} \tag{132}$$

The prediction vector can then be formulated using the time derivation of the system $$\hat{y}_j |_t = \sum_{i=1}^{n_a} y_{oi}|_t \alpha_i^j + u|_{(t-\Delta t)} k_i(1 - \alpha_i^j) + k_{di}(1 - \alpha_i^j) \tag{133}$$

Adding the control action dynamics and current position dynamics together allows the equation to be simplified.

$$\hat{y}_j |_t = \sum_{i=1}^{n_a} (u|_{(t-\Delta t)} k_i - y_{oi}|_t + k_{di})(1 - \alpha_i^j) + \sum_{i=1}^{n_a} y_{oi}|_t \tag{134}$$

Replacing the prediction vector in Eq. 132 with Eq. 134 the error vector can be written in terms of the current error value ($r - y_o = e_o$).

$$\hat{e} = e_o|_t - \sum_{i=1}^{n_a} (u|_{(t-\Delta t)} k_i - y_{oi}|_t + k_{di})(1 - \alpha_i^j) \tag{135}$$

Rearranging Eq.135 allows the error vector to be written as two separate vectors.

$$\hat{e} = e_o|_t \begin{bmatrix} 1 \\ 1 \\ \vdots \\ 1 \end{bmatrix} + \sum_{i=1}^{n_a} (y_{oi}|_t - u|_{(t-\Delta t)} k_i - k_{di}) \begin{bmatrix} (1-\alpha_i) \\ (1-\alpha_i^2) \\ \vdots \\ (1-\alpha_i^N) \end{bmatrix} \tag{136}$$

Using this new equation for the error vector the and the dynamic matrix control law an equation can be formulated for the change in the control action.

$$\Delta \hat{u} = M^{-1} A^T \hat{e} \tag{137}$$

$$\Delta \hat{u} = \tag{138}$$

$$e_o|_t M^{-1} A^T \begin{bmatrix} 1 \\ 1 \\ \vdots \\ 1 \end{bmatrix} + \sum_{i=1}^{n_u} (y_{oi}|_t - u|_{(t-\Delta t)} k_i - k_{di}) M^{-1} A^T \begin{bmatrix} (1-\alpha_i) \\ (1-\alpha_i^2) \\ \vdots \\ (1-\alpha_i^N) \end{bmatrix}$$

Using the $\hat{c}_1$ and $\hat{c}_{2i}$ vector the equation can be rewritten.

$$\Delta \hat{u} = e_o|_t \hat{c}_1 + \sum_{i=1}^{n_2} (y_{oi}|_t - u|_{(t-\Delta t)} k_i - k_{di}) \hat{c}_{2i} \tag{139}$$

where $\hat{c}_1 = M^{-1} A^T \begin{bmatrix} 1 \\ 1 \\ \vdots \\ 1 \end{bmatrix}$ $\hat{c}_{2i} = M^{-1} A^T \begin{bmatrix} (1-\alpha_i) \\ (1-\alpha_i^2) \\ \vdots \\ (1-\alpha_i^N) \end{bmatrix}$ Since only the first element of the control action change vector is implemented on the plant the Eq. 139 can be reduced to the following.

$$\Delta u|_t = e_o|_t c_1 - u|_{(t-\Delta t)} c_3 - c_4 + \sum_{i=1}^{n_2} y_{oi}|_t c_{2i} \tag{140}$$

where $\Delta u = \Delta \hat{u}(1)$ $c_1 = \hat{c}_1(1)$ $c_{2i} = \hat{c}_{2i}(1)$ $c_3 = \sum_{i=1}^{n_a} k_i c_{2i}$ $c_4 = \sum_{i=1}^{n_a} k_{di} c_{2i}$ Rearranging Eq. 140 and replacing the control action change ($\Delta u$) the following equation can be derived.

$$(u|_t - u|_{(t-\Delta t)}) + c_3 u|_{(t-\Delta t)} = c_1 e_o|_t - c_4 + \sum_{i=1}^{n_a} c_{2i} y_i|_t \quad (141)$$

Taking the Laplace transform of Eq. 141

$$(\Delta t(1-c_3)s + c_3)U(s) = c_1 E(s) + \sum_{i=1}^{n_a} c_{2i} Y_i(s) - \frac{1}{s} c_4 \quad (142)$$

Using the general equation for the system (Eq. 126) the equation Eq. 142 can be rearranged into a transfer function between the error and the control action.

$$(\Delta t(1-c_3)s + c_3)U(s) = c_1 E(s) + \sum_{i=1}^{n_a} c_{2i} \left( \frac{k_i U(s) + k_{di}}{\tau_i s + 1} \right) - \frac{1}{s} c_4 \quad (143)$$

$$\left( \Delta t(1-c_3)s + c_3 - \sum_{i=1}^{n_a} \frac{k_i c_{2i}}{\tau_i s + 1} \right) U(s) = c_1 E(s) + \sum_{i=1}^{n_a} \frac{k_{di}}{\tau_i s} - \frac{1}{s} c_4 \quad (144)$$

$$U(s) = \frac{\left( \prod_{i=1}^{n_a} \tau_i s + 1 \right)(c_1 s E(s) - c_4) + \sum_{i=1}^{n_a} k_{di}}{(\Delta t(1-c_3)s^2 + c_3 s)\left( \prod_{i=1}^{n_a} \tau_i s + 1 \right) -} \quad (145)$$

$$s \sum_{j=1}^{n_a} \left( (k_j c_s j) \left( \prod_{i=1}^{j-1} \tau_i s + 1 \right) \left( \prod_{i=j+1}^{n_a} \tau_i s + 1 \right) \right)$$

Converting the transfer function seen in Eq. 145 into discrete time will yield the control law.

8. Non-Linear Controller Theory

In order to maintain a fast computational time in the control of non-linear systems, a linear optimization will still have to be utilized. For other comparable controllers this means that the system will have to be linearized at the current operating point at each time step. The benefit of having this reduction process is it allows the linearization of each point to be condensed into a select number of control parameters. This would allow the linearization to be performed prior and stored in a multi-dimensional array. The following sections, section 8.1 and section 8.2, provides the different methodologies for performing this linearization.

8.1 Equation Model

The first method in creating this multi-dimensional array is to have an equation that represents the non-linear system. Using this single non-linear equation an analytical linearization can be performed for any operating point of the system. This generic linearization would allow the non-linear model to be expressed as a set of linear equations. Using this set of linear equations the general linear system control theory (Section 5) can be used to determine the control parameters, thus creating the multi-dimensional array of control constants.

Consider the non-linear equation found in Eq. 146 where f(y) is a non-linear equation with respect to y. The linearized form of this equation can be seen in Eq. 147.

$$a_{n_a} \frac{d y^{n_a}}{d^{n_a} t} + \dots + a_1 \frac{dy}{dt} + y + f(y) = b_{m_b} \frac{d y^{m_b}}{d^{m_b} t} + \dots + b_1 \frac{dy}{dt} + u \quad (146)$$

$$a_{n_a} \frac{d y^{n_a}}{d^{n_a} t} + \dots + a_1 \frac{dy}{dt} + y + \frac{df(\bar{y})}{d\bar{y}} (y - \bar{y}) + f(\bar{y}) = \quad (147)$$

$$b_{m_b} \frac{d y^{m_b}}{d^{m_b} t} + \dots + b_1 \frac{du}{dt} + u$$

With this linearized version of the equations, the previously derived linear systems theory can be utilized to calculate the control parameters for an array of operating points ($\bar{y}$). These constants can then be stored in an array allowing them to be accessed during operation.

8.2 Complex Model

Some systems are not able to be placed into analytical models similar to the one presented in Eq. 146. This requires an alternative approach to be applied. In the first approach the system was analytically linearized to generate the array of control parameters, which is not possible so a set of simulations can be used to capture the dynamics throughout the range of motion.

Using the equation of the change in control action from the second order system Eq. 53 as a basis, the non-linear control theory can be derived. Separating this equation into its dynamics, there is a step test (in the $M^{-1}$ and $A^T$ matrices and the second error array) and an impulse test (in the third error array).

There is one item that is not captured in Eq. 53 that has to be included in the equation for the non-linear systems. As it is common for non-linear systems to have varying instantaneous (time varying) gains, the assumption that steady state output is equal to instantaneous gain multiplied by the control action ($y_{ss} = k_p * u_{ss}$) is no longer valid. This means the control action has to be adjusted to include an additional term $y_{ss} = k_p * u_{ss} + k_d$. This allows the instantaneous gain ($k_p = \Delta y_{ss}/\Delta u_{ss}$) to have a better depiction of the current system dynamics.

The following is an explanation of how to acquire the required current dynamics of a system model based in simulation. As this is a simulation, initial conditions are required for each of the operating points that the controllers parameters are to be calculated at. To ensure the simulation is accurate the initial conditions should correlate to the steady state values that enable the system to be stationary at this particular state.

With these steady state values as initial conditions, a small change in the control action can be simulated (du). Normalizing the change in the response with respect to the small control action change will give the normalized step test that contains the current system dynamics. Also the instantaneous gain can determined as it would be the change in steady state value due to the control action change divided by the control action change ($k_p = \Delta y_{ss}/du$). Also from this the adjustment term can be calculated $k_d = y_{ss} - k_p u_{ss}$.

The impulse can be captured by running the simulation when all the initial conditions are set to the steady state values except for the velocity which is set to one.

$$u|_t = d_1 e_o|_t + (1 - d_2 k_p) u|_{(t-\Delta t)} + (d_2 - d_3) y_o|_t + d_3 y_o|_{(t-\Delta t)} - d_2 k_d \quad (148)$$

$$\text{where } d_1 = \frac{1}{k_p^2} M^{-1} A^T \begin{bmatrix} 1 \\ 1 \\ \vdots \\ 1 \end{bmatrix}$$

$$d_2 = \frac{1}{k_p^2} M^{-1} A^T \begin{bmatrix} \hat{c}_1 \\ \hat{c}_2 \\ \vdots \\ \hat{c}_N \end{bmatrix}$$

$$d_3 = \frac{1}{k_p^2 \Delta t} M^{-1} A^T \begin{bmatrix} \hat{g}_1 \\ \hat{g}_2 \\ \vdots \\ \hat{g}_N \end{bmatrix}$$

$\hat{c}_i = i^{th}$ value of the normalized step test $\hat{g}_i = i^{th}$ value of the impulse test

9. Operation
9.1 Industrial Robot

An industrial robotic manipulator real time offset compensation with Stateless Discrete Predictive Controller (SDPC). In the setup of a real time offset adjustment the current position of the robot can be measured through the encoders built into the manipulator. Reading these give the current position of the robot and comparing this to the a desired position of the robot gives an error which is the value taking by the controller each control cycle.

With this error value the control structure would calculate the optimal corrective measure for the servos motors to reduce this error as soon as possible. This corrective measure would be sent to the servo drives and then this process would start again in the next control cycle.

In order for the control structure to calculate the optimal corrective measure to send to the servos it has to have a model of the system. This model can be generated through any standard modeling technique but has to be able to accurately contain the dynamics of the robot position to changes in the servo inputs.

Taking this model and breaking into discrete linear operating ranges, the initial non-linear model can be composed of a series linear model that each represent the dynamics in a specific range.

With this set of linear models the control parameters for each of these models can be calculated. These parameter are the $d_1$, $d_{2i}$, and $d_3$ found in the equations below. These parameters are then stored so they can be accessed by the real time control system each control cycle.

The part of the controller that is to be implement on the physical robot is a discretized version of the $U(s)/E(s)$ equation. In each control cycle the controller would check which of the operating ranges it is in and pull the control parameters associated with that range. With those parameters the controller can then determine the next optimal position to send to the servos ($U(s)$).

9.2 Other Implementations

There are a number of different applications where this control structure can be applied to. The key components of this structure are in the calculation of the control parameters from the model before the controller is operating. These parameters have been formulated so they inherently contain a full stateless prediction of the system at the current system dynamics. Using these parameters with the controller in the control cycle provides the benefit of the a model predictive controller with a computational time that is significantly reduced. To transfer this control structure to a different system the steps that would change are the setting up of the system in terms of what is physically controlled.

10. Equation $$\frac{U(s)}{E(s)} = \frac{d_1 \left( \prod_{i=1}^{n_a} \tau_i s + 1 \right)}{(\Delta t(1 - d_3)s^2 + d_3) \left( \prod_{i=1}^{n_a} \tau_i s + 1 \right) - \sum_{j=1}^{n_a} \left( (k_j d_{2j}) \left( \prod_{i=1}^{j-1} \tau_i s + 1 \right) \left( \prod_{i=j+1}^{n_a} \tau_i s + 1 \right) \right)}$$

System Model:

$$\frac{Y(s)}{U(s)} = \sum_{i=1}^{n_a} \frac{k_i}{\tau_i s + 1}$$

System Constants:

$n_a$ Order of the system $\tau_i$ $i^{th}$ order time constant $k_i$ $i^{th}$ order gain System Variable $U(s)$ Input to the system $E(s)$ Error between the system output and desired output $Y(s)$ Output of the system Variables $s$ LaPlace frequency variable $\Delta t$ Controller sample time $d_1 = \hat{d}_1(1)$ $d_{2i} = \hat{d}_{2i}(1)$ $$d_3 = \sum_{i=1}^{n_a} k_i d_{2i}$$

$$\hat{d}_1 = M^{-1} A^T \begin{bmatrix} 1 \\ 1 \\ \vdots \\ 1 \end{bmatrix}$$

$$\hat{d}_{2i} = M^{-1} A^T \begin{bmatrix} (1 - \alpha_i) \\ (1 - \alpha_i^2) \\ \vdots \\ (1 - \alpha_i^N) \end{bmatrix}$$

$$A = \begin{bmatrix} \hat{c}_1 & 0 & \cdots & 0 \\ \hat{c}_2 & \hat{c}_1 & \cdots & 0 \\ \vdots & \vdots & \ddots & \vdots \\ \hat{c}_N & \hat{c}_{N-1} & \cdots & \hat{c}_{N-n_a+1} \end{bmatrix}$$

$M =$

-continued $$\begin{bmatrix} \lambda \sum_{j=1}^{N}(\hat{c}_j)^2 & \sum_{j=1}^{N-1}(\hat{c}_j)(\hat{c}_{j+1}) & \cdots & \sum_{j=1}^{N-n_u+1}(\hat{c}_j)(\hat{c}_{j+n_u-1}) \\ \sum_{j=1}^{N-1}(\hat{c}_j)(\hat{c}_{j+1}) & \lambda \sum_{j=1}^{N-1}(\hat{c}_j)^2 & \cdots & \sum_{j=1}^{N-n_u+1}(\hat{c}_{jj})(\hat{c}_{j+n_u-2}) \\ \vdots & \vdots & \ddots & \vdots \\ \sum_{j=1}^{N-n_u+1}(\hat{c}_j)(\hat{c}_{j+n_u-1}) & \sum_{j=1}^{N-n_u+1}(\hat{c}_j)(\hat{c}_{j+n_u-2}) & \cdots & \lambda \sum_{j=1}^{N-n_u+1}(\hat{c}_j)^2 \end{bmatrix}$$

$$\hat{c}_j = \sum_{i=1}^{n_a} k_i (1 - \alpha_i^j)$$

$\alpha_i$ Constant $\left( e^{\frac{-\Delta t}{\tau_i}} \right)$

Tunning Parameters

N Prediction horizon length $n_u$ Control horizon length $\lambda$ Move suppression factor

11. Simulation System Tests

During the development of the controller various systems were used to evaluate the performance of the control schemes. For these simulations the dynamic matrix control (DMC) approach was used as a comparison because it has the same objective function structure, as well as being the standard algorithm of predictive control schemes. Having both algorithms controlling each system also allows the computational time required for each control cycle to be accurately compared.

11.1 First Order System

As with the derivation of the controller theory, the evaluation commences with a first order system. Eq. 149 contains the Laplace equation for the system used with the constants in Table 1. This first order system model has been derived from a DC motor with no load.

$$G(s) = \frac{k_p}{\tau s + 1} \quad (149)$$

TABLE 1

First Order System Constants

| Parameter | Value |
|---|---|
| $k_p$ | 2.0 |
| $\tau$ | 0.725 |

The control parameters for these simulations are as follows in Table 2 and are the same for both controllers.

TABLE 2

First Order Controller Constants

| Description | Symbol | Value |
|---|---|---|
| Prediction Horizon | N | 500 |
| Control Horizon | $n_u$ | 5 |
| Move Suppression | $\lambda$ | 1.01 |

Figure 3:
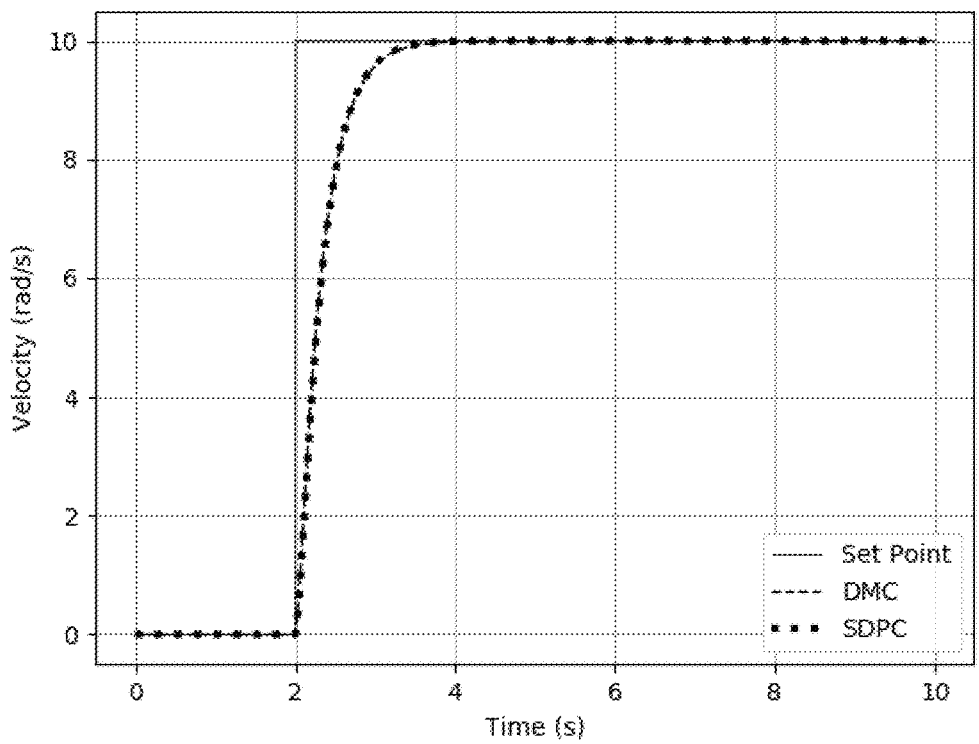
FIG. 3 is a graph of a simulation output of a first order system; First Order Plant Output.
Figure 4:
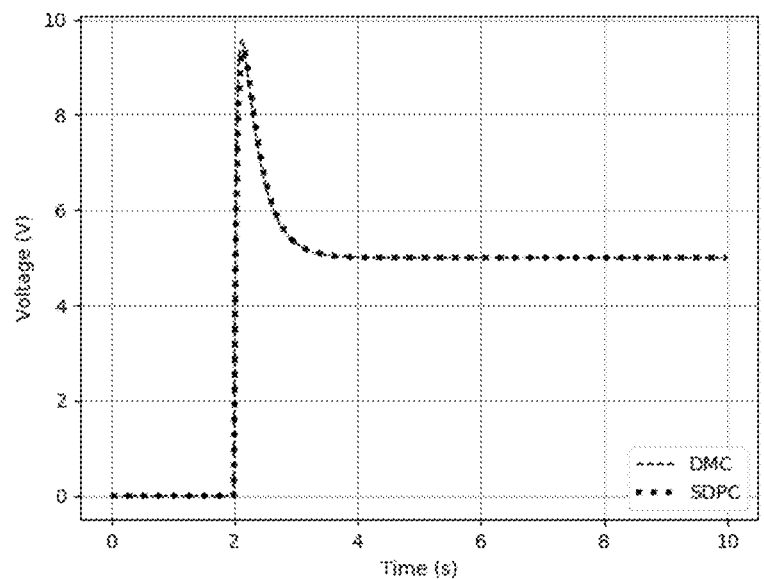
FIG. 4 is a graph of a controller output in a first order system; First Order Plant Input.

FIG. 3 contains the velocity output of the simulated DC motor for both the conventional DMC and the newly formulated stateless discrete predictive controller, SDPC. From this graph it can be observed that the performance of the two controllers are identical. This is indicated in the plot of the voltage supplied to the motor in FIG. 4.

Figure 5:
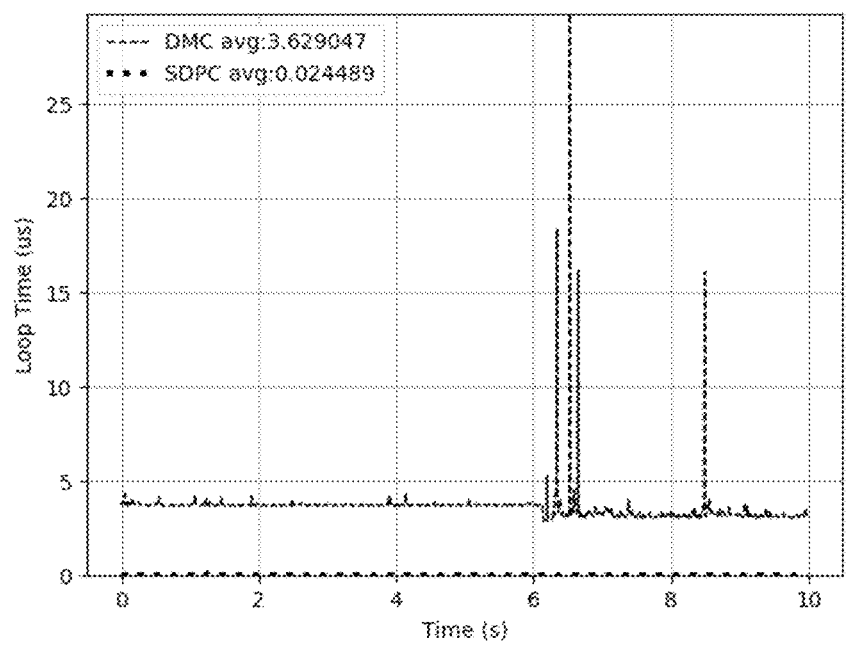
FIG. 5 is a graph of computational time for a first order system; First Order Controller Computation Time.

The advantage of the discrete version of the MPC controller is in the reduction in computation time required to, determine the control output each control cycle. To evaluate this, both controllers were implemented using the C programming language to run the simulations with an accurate measurement of each control cycle duration. FIG. 5 contains the plot of the computational time for the controllers seen in FIG. 3. It is apparent that the stateless discrete predictive controller requires significantly less computational time than the conventional DMC controller.

11.2 Second Order System

The next system used to evaluate the performance of the scheme is a second order system having a relative low damping. The general equation for a second order system can be seen in Eq. 150, with the parameters used for this simulation in table 3. The model has been derived from a DC motor with an external load.

$$G(s) = \frac{k_p \omega_n^2}{s^2 + 2\zeta\omega_n s + \omega_n^2} \quad (150)$$

TABLE 3

Second Order System Constants

| Parameter | Value |
|---|---|
| $k_p$ | 2.0 |
| $\zeta$ | 0.3 |
| $w_n$ | 2.0 |

Table 4 contains the control parameters used for the simulation.

TABLE 4

Second Order Controller Constants

| Description | Symbol | Value |
|---|---|---|
| Prediction Horizon | N | 600 |
| Control Horizon | $n_u$ | 10 |
| Move Suppression | $\lambda$ | 1.01 |

Figure 6:
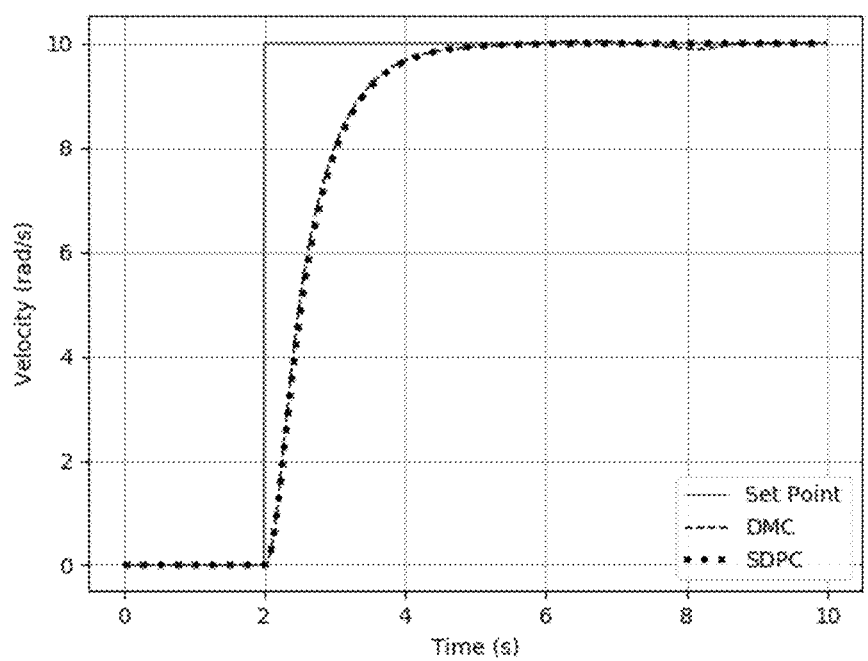
FIG. 6 is a graph of simulation output of a second order system; Second Order Plant Output.
Figure 7:
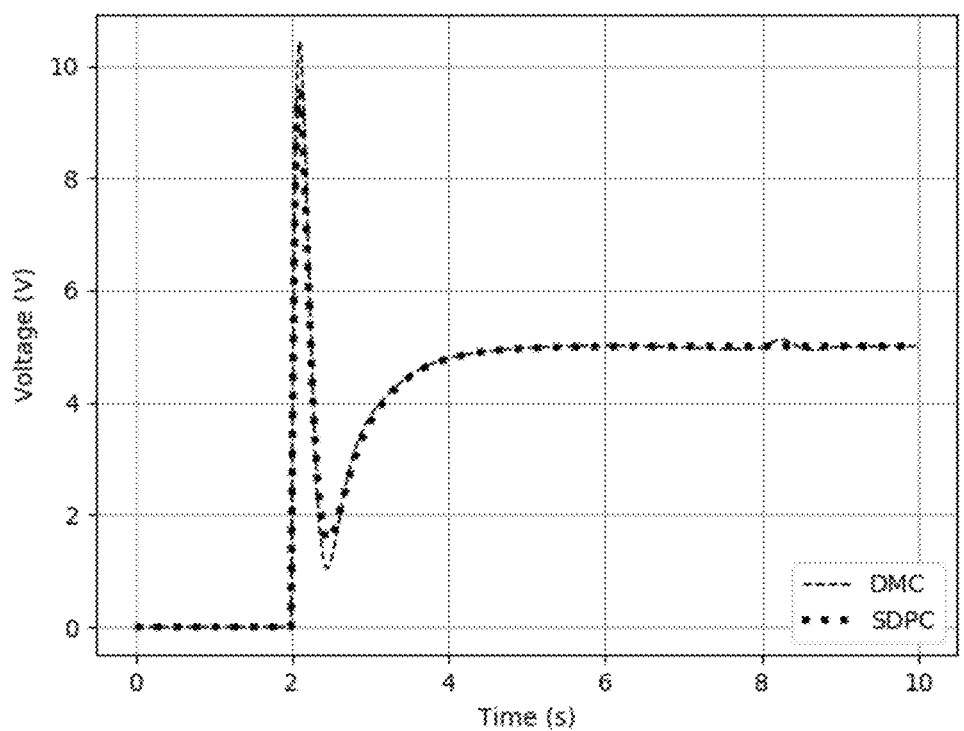
FIG. 7 is graph of controller output in a second order system; Second Order Plant Input.

Similar to the first order system responses, the two controllers' simulations have an almost identical motor, output. This can be seen in FIG. 6 and FIG. 7. There is one noticeable difference between the two simulations, around eight seconds into the simulation there is a minor bump in the response of the conventional DMC. This is caused by the prediction horizon N and is investigated further in section 12.

Figure 8:
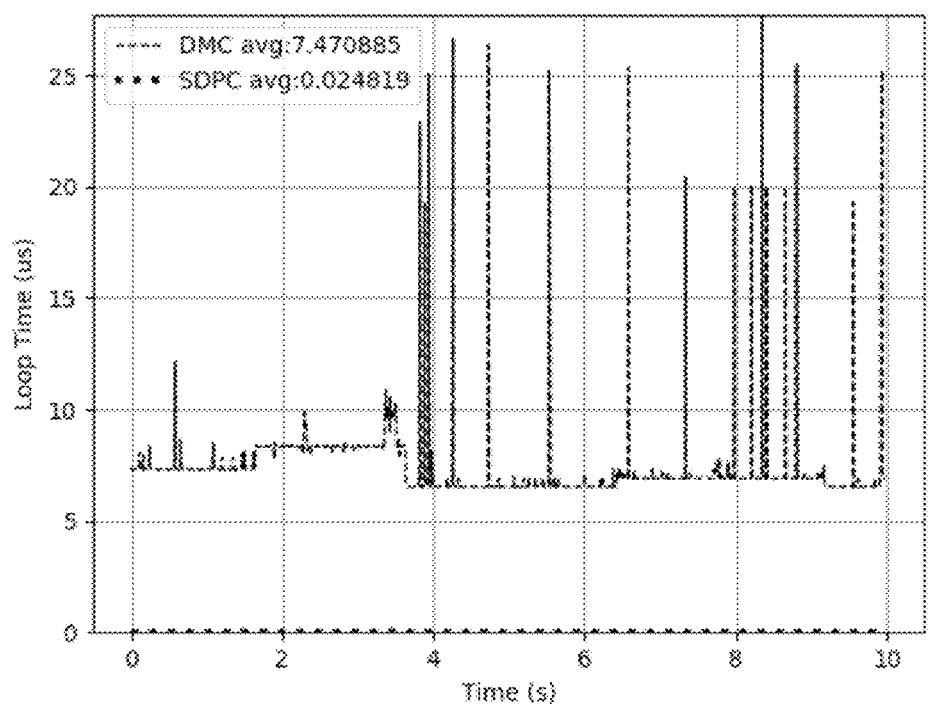
FIG. 8 is graph of computational time for a second order system; Second Order Controller Computation Time.

Again the controller code was written using the C programming language with an accurate record of the controller execution time for comparisons. FIG. 8 shows the comparison where the conventional DMC takes significantly longer than the stateless discrete predictive controller.

11.3 First Order Plus Dead Time System

This section presents the results from simulations executed with a first order plus dead time system model. The formulation of the model can be seen in Eq. 151 with the parameters in Table 5. This model was taken from a no load DC motor with the dead time exaggerated so that the controllers ability to handle the reaction delay could be evaluated.

$$G(s) = \frac{k_p e^{-\theta s}}{\tau s + 1} \quad (151)$$

TABLE 5

First Order Plus Dead Time System Constants

| Parameter | Value |
|---|---|
| $k_p$ | 2.0 |
| $\theta$ | 0.5 |
| $\tau$ | 0.25 |

Table 6 contains the control parameters used for the simulation.

TABLE 6

First Order Plus Dead Time Controller Constants

| Description | Symbol | Value |
|---|---|---|
| Prediction Horizon | N | 1000 |
| Control Horizon | $n_u$ | 2 |
| Move Suppression | $\lambda$ | 1.1 |

Figure 9:
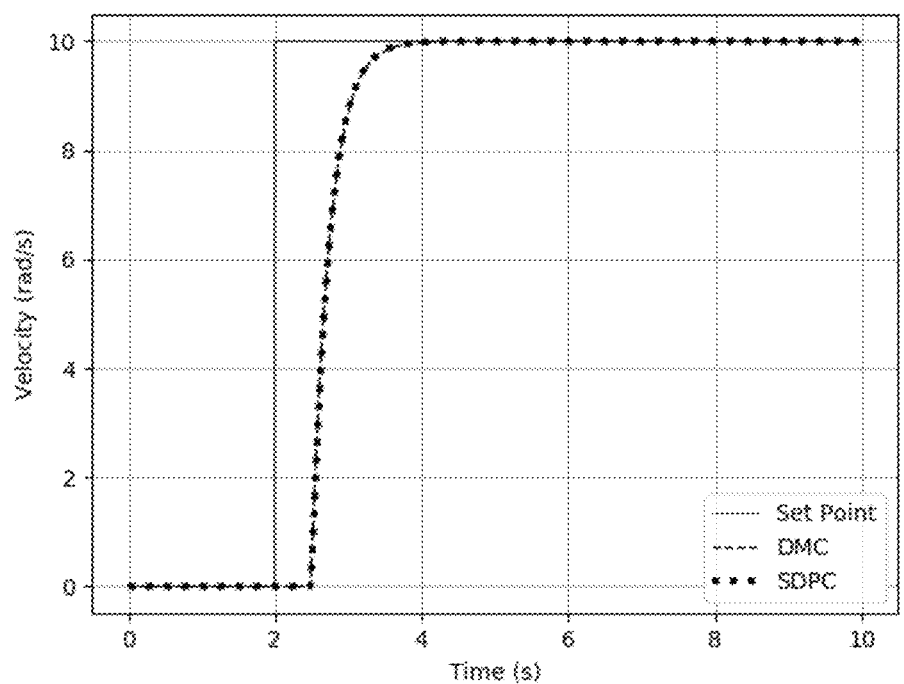
FIG. 9 is a graph of simulation output of a first order plus dead time system; First Order Plus Dead Time Plant Output.
Figure 10:
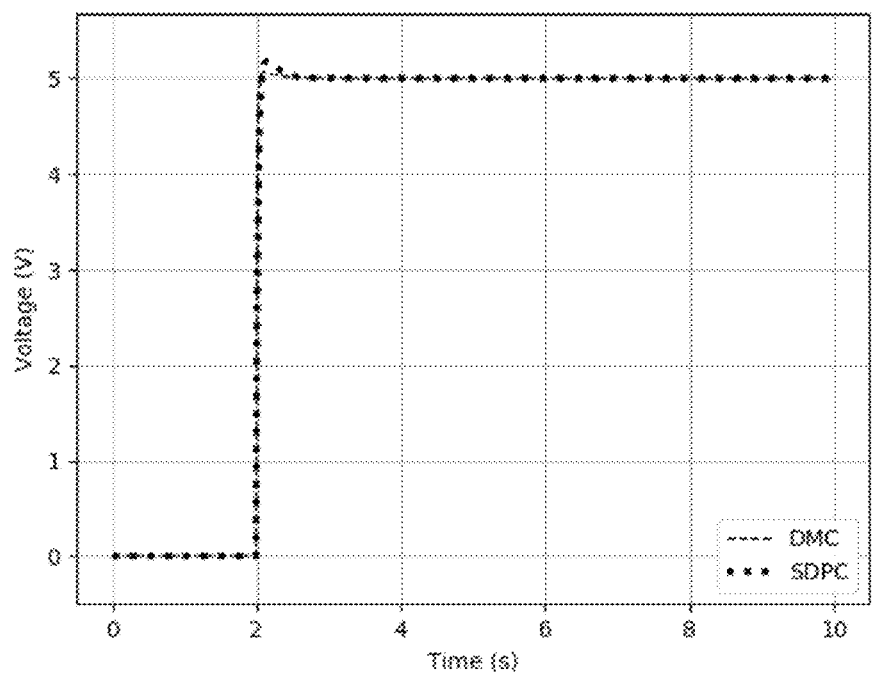
FIG. 10 is graph of controller output in a first order plus dead time system; First Order Plus Dead Time Plant Input.

As expected the response of the system with the two controllers is similar as shown in FIG. 9 and FIG. 10.

Figure 11:
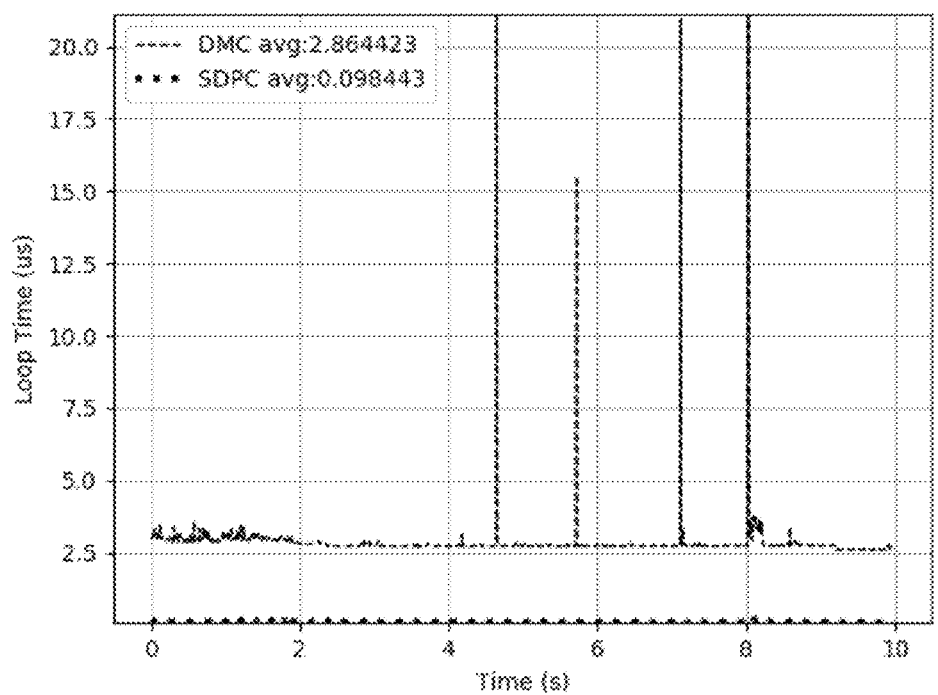
FIG. 11 is graph of computational time for a first order plus dead time system; First Order Plus Dead Time Controller Computation Time.

FIG. 11 has a graph of the computational time for each control cycle during the simulation. It is apparent that the stateless discrete predictive controller computes its control action in a reduced amount of time but at less of a reduction than the previous system types. This increase is due to a characteristic of First Order Plus Dead Time (FOPDT) systems, the inherent delayed reaction in the output from a change to the input. These delayed reactions have to be accounted for in the control algorithm so they have to be stored until they come into effect which requires more computational time. The amount of additional stored variables is the number of time steps within the dead time, which will always be significantly out-numbered by the variables the conventional DMC stores for the prediction horizon N and control horizon n u. Therefore a reduction in the computational time from the conventional DMC to the stateless discrete predictive controller is expected irrelevant of the dead time.

11.4 General Linear System

For the evaluation of the general linear controller an underdamped third order system with one zero was selected. The equation of the model is in Eq. 152 with the parameters shown in Table 7.

$$\frac{Y(s)}{U(s)} = \frac{b_o + b_1 s}{1 + a_1 s + a_2 s^2 + a_3 s^3} \quad (152)$$

TABLE 7

General Linear System Constants

| Parameter | Value |
|---|---|
| $a_1$ | 1.3 |
| $a_2$ | 1.3 |
| $a_3$ | 0.8 |
| $b_0$ | 1.0 |
| $b_1$ | 0.2 |

For this simulation the selected control parameter are shown below in Table 8.

TABLE 8

General Linear Controller Constants

| Description | Symbol | Value |
|---|---|---|
| Prediction Horizon | N | 3000 |
| Control Horizon | $n_u$ | 5 |
| Move Suppression | $\lambda$ | 1.01 |

Figure 12:
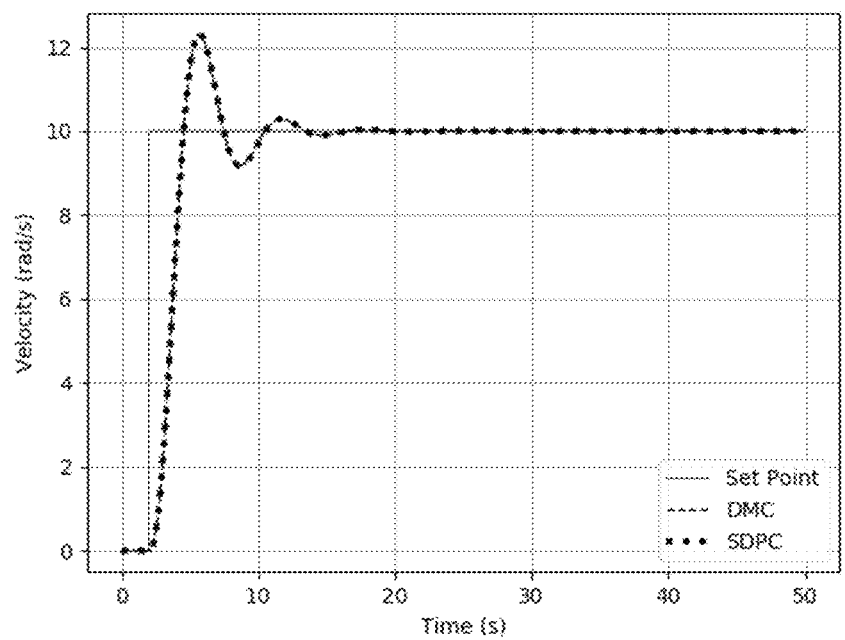
FIG. 12 is graph of simulation output of a general linear system; General Linear Plant Output.
Figure 13:
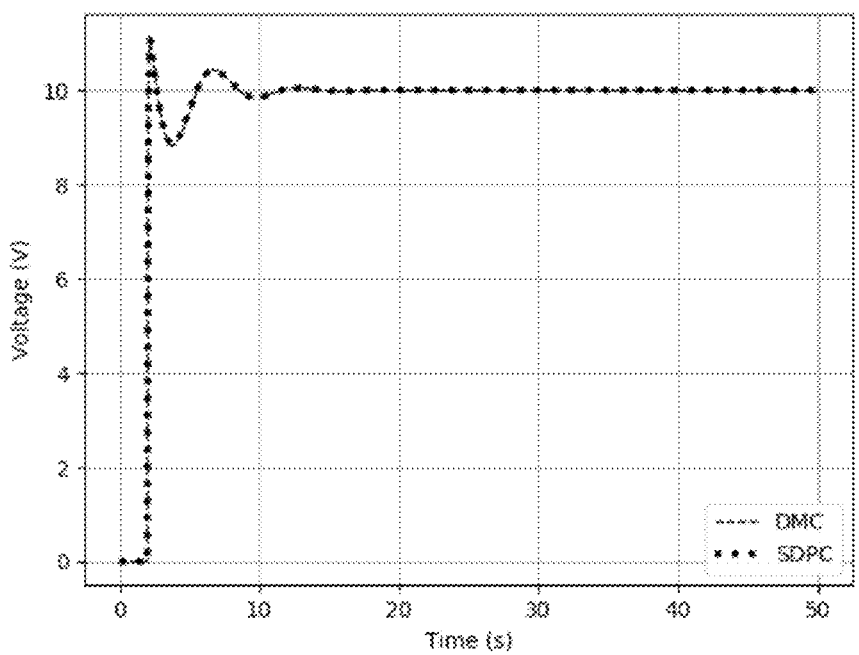
FIG. 13 is graph of controller output in a general linear system; General Linear Plant Input.

The response of the two controllers can be seen in FIG. 12 and FIG. 13. Due to the highly underdamped nature of the system the step test of the controller is expected to have overshoot but still settle at the set point.

Figure 14:
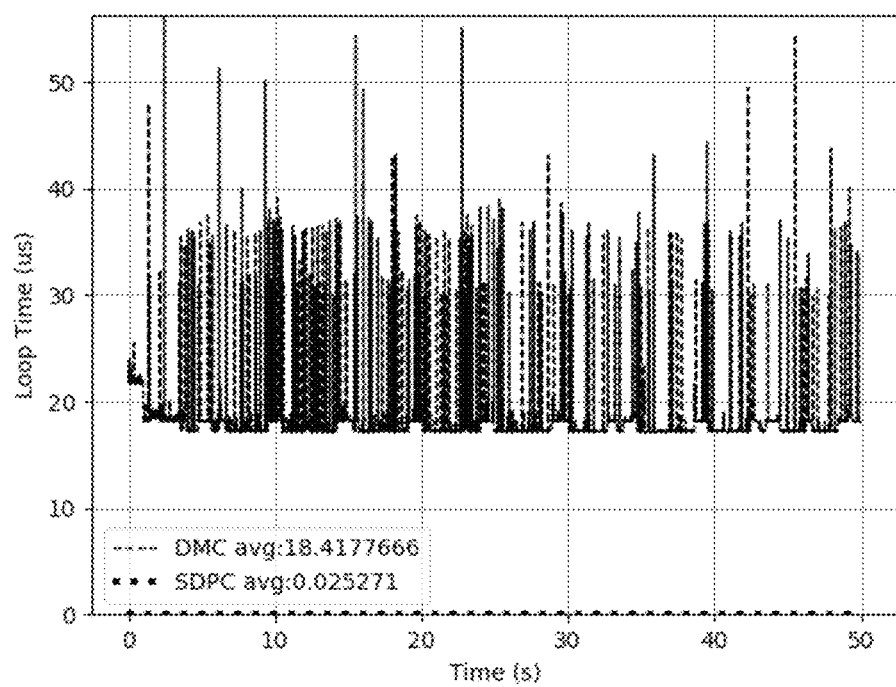
FIG. 14 is graph of computational time for a general linear system; General Linear Controller Computation Time.

Another effect of the underdamped nature of the system is its requirement for a longer prediction horizon to achieve stable control. This corresponds to more calculations required for the conventional DMC which translates to a more significant difference between the computational times of the two controllers. This can be observed in FIG. 14.

11.5 MIMO System

This section includes the evaluation of multiple input multiple output MIMO stateless discrete predictive controller theory. The system chosen for testing has the following interactions. Second order dynamics for input one to output one and input two to output two. The interactions or cross dynamics are both first order. The equation for these dynamics can be seen in Eq. 153, with the parameters in Table 9. In this example, there will be four dynamic equations: $Y_1(s)/U_1(s)$, $Y_1(s)/U_2(s)$, $Y_2(s)/U_1(s)$, and $Y_2(s)/U_2(s)$. The four equations are required to capture the dynamic between each separate input out each output.

$$\frac{Y_1(s)}{U_1(s)}, \frac{Y_1(s)}{U_2(s)}, \frac{Y_2(s)}{U_1(s)}, \text{ and } \frac{Y_2(s)}{U_2(s)}.$$

The four equations are required to capture the dynamic between each separate input out each outputs $$\frac{Y_w(s)}{U_v(s)} = \frac{b_{w,v,0} + b_{w,v,1}s + \ldots + b_{w,v,m_{b(w,v)}}s^{m_b(w,v)}}{1 + a_{w,v,1}s + \ldots + a_{w,v,n_{a(w,v)}}s^{n_a(w,v)}} \quad (153)$$

TABLE 9

MIMO System Constants

| Parameter | Value |
|---|---|
| $a_{1,1,1}$ | 1.0 |
| $a_{1,1,2}$ | 1.75 |
| $b_{1,1,0}$ | 1.5 |
| $a_{1,2,1}$ | 1.3 |
| $b_{1,2,0}$ | 0.5 |
| $a_{2,1,1}$ | 2.0 |
| $b_{2,1,0}$ | 1.0 |
| $a_{2,2,1}$ | 1.0 |
| $a_{2,2,2}$ | 1.5 |
| $b_{2,2,0}$ | 2.5 |

The control parameters used for the simulation can be seen in Table 10.

TABLE 10

MIMO Controller Constants

| Description | Symbol | Value |
|---|---|---|
| Prediction Horizon | N | 500 |
| Control Horizon | $n_u$ | 10 |
| Move Suppression | $\lambda$ | 1.01 |

Figure 15:
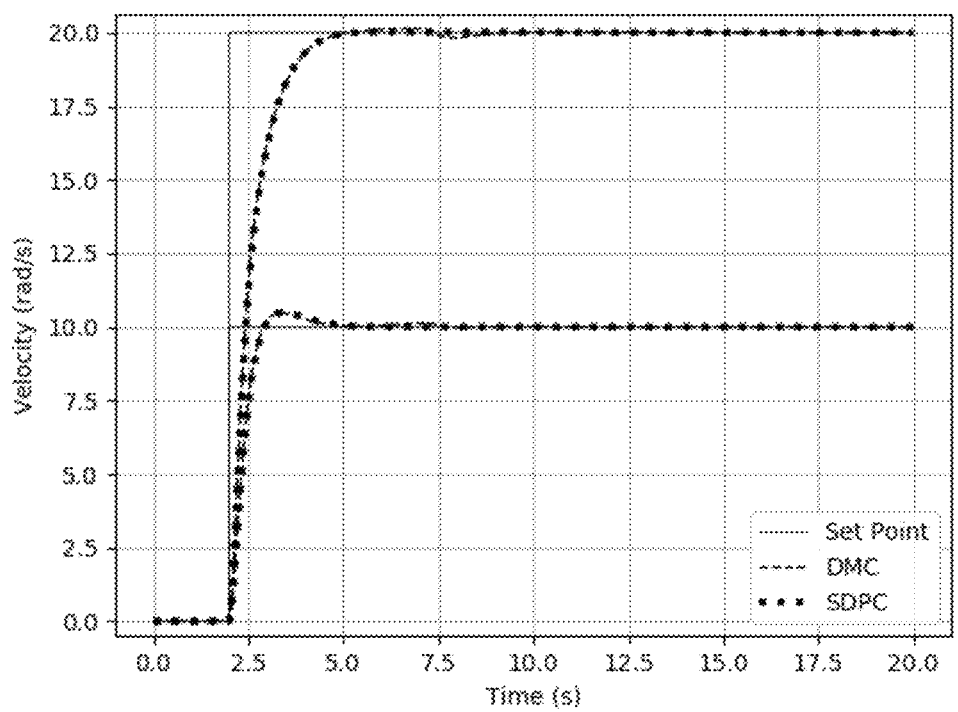
FIG. 15 is a graph of simulation outputs of a mutiple-input and multiple-output (MIMO) system; MIMO Plant Outputs.
Figure 16:
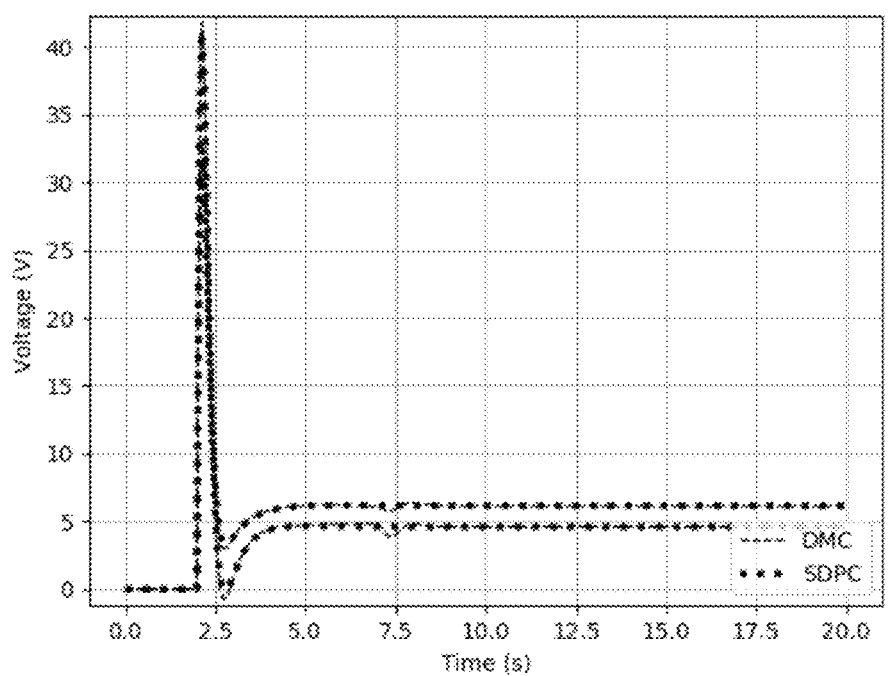
FIG. 16 is graph of controller outputs in a MIMO system; MIMO Plant Inputs.

The following figures, FIG. 15 and FIG. 16, contain the response of both inputs for the system. In these graphs input and output one is represented by a solid line while input and output two is represented by a dashed line for step changes in setpoint.

Figure 17:
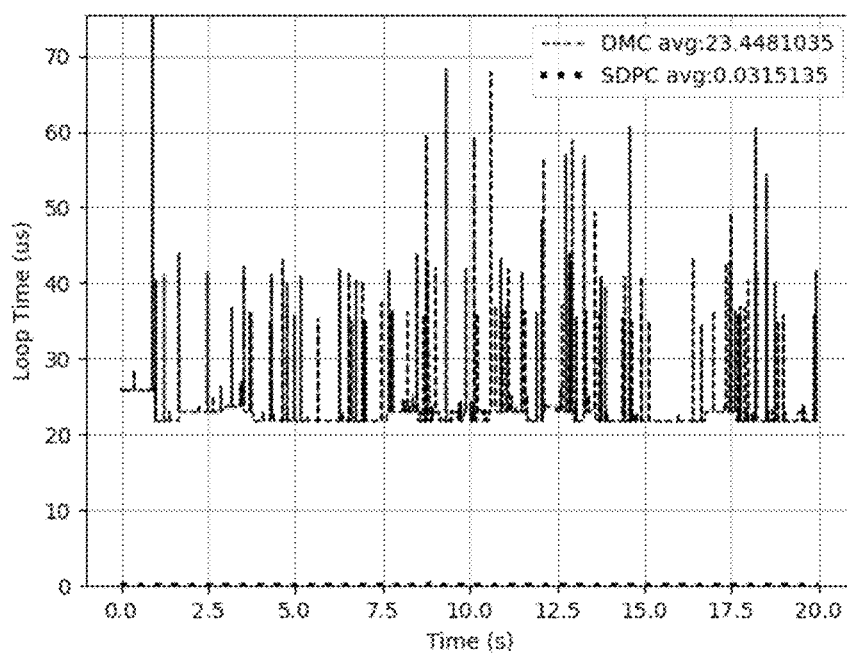
FIG. 17 is graph of computational time for a MIMO system; MIMO Controller Computation Time.

With there being multiple dynamics between each of the inputs and each of the outputs, the computational time of the conventional DMC is significantly higher than the stateless discrete predictive controller. This can be observed in the graph of the computational time of each controller, for each control cycle in FIG. 17.

11.6 Nonlinear Robot System

In order to verify the functionality of the nonlinear control structure a model of a vertical robotic manipulator was used. This model is in the state space form and can be seen in Eq. 154 with the parameters in Table 11.

$$\ddot{\theta} = b_0 u + a_0 \dot{\theta} + a_1 \sin(\theta) \tag{154}$$

TABLE 11

Nonlinear Robot Constants

| Parameter | Value |
|---|---|
| $a_0$ | 2.63 |
| $a_1$ | −55.30 |
| $b_0$ | 16.07 |

Table 12 contains the control parameters for the model predictive controllers.

TABLE 12

Nonlinear Robot Controller Constants

| Description | Symbol | Value |
|---|---|---|
| Prediction Horizon | N | 500 |
| Control Horizon | $n_u$ | 10 |
| Move Suppression | $\lambda$ | 1.01 |
| Control Action Change | du | 0.1 |

Figure 18:
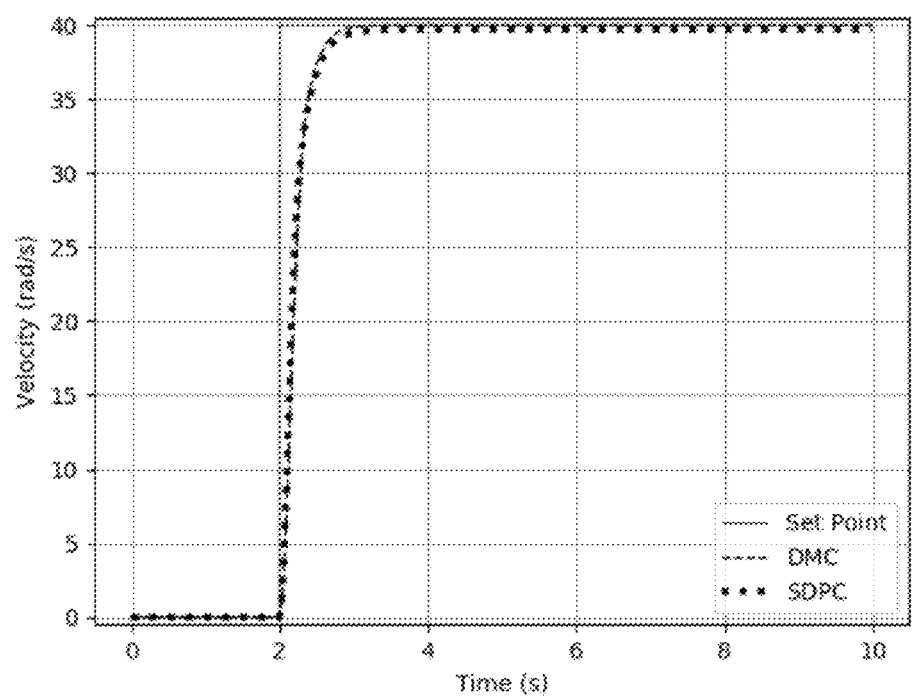
FIG. 18 is a graph of simulation output of a non-linear robot; Nonlinear Robot Output.
Figure 19:
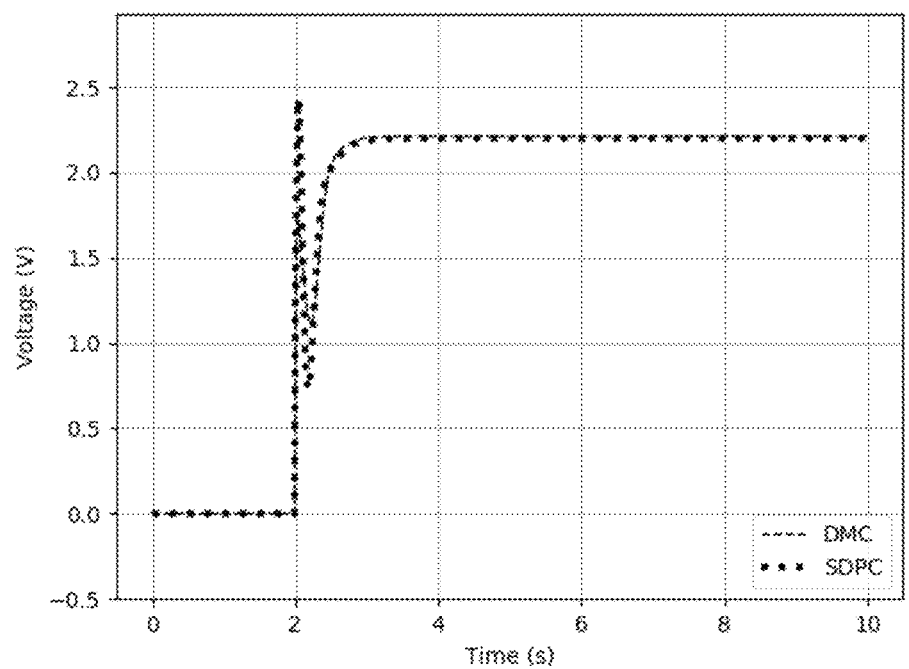
FIG. 19 is graph of controller output in a non-linear robot; Nonlinear Robot Input.
Figure 20:
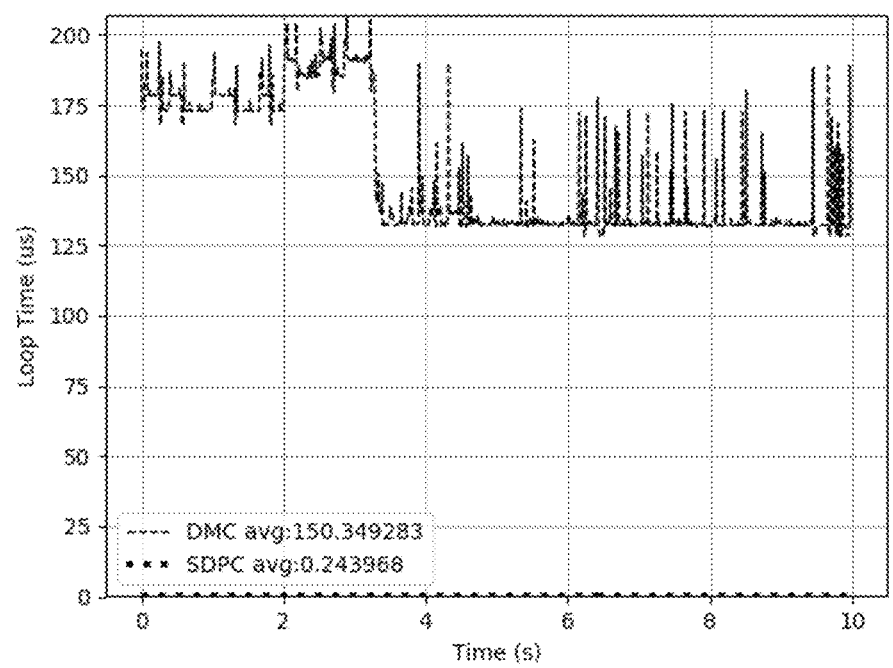
FIG. 20 is graph of computational time for a non-linear robot; Nonlinear Controller Computation Time.

For the simulation a set-point was selected to have the robot move through positions of highly variable, dynamics, to evaluate the controllers ability to compensate for the non-linearities. FIG. 18 and FIG. 19 show the output angle of the robot and the voltage supplied to the motor throughout the simulation. With the nonlinear system the dynamics are constantly changing, which requires the controller to linearize the current dynamics at each cycle. This is a computationally expensive task which correlates to high computational time for the conventional DMC controller. This issue is also seen by the stateless discrete predictive controller but to a substantially lesser degree as in FIG. 20.

11.7 Computational Times

As a further investigation into the computational time reduction, a series of simulations were conducted. These simulations were design to determine to what extent the stateless discrete predictive controller is computationally faster than the conventional dynamic matrix controller. These tests varied the control and prediction horizon for the six simulations that were discussed in section 11.1 to section 11.6. The results can be seen in FIG. 21 to FIG. 26. Throughout all of the test cases the stateless discrete predictive controller has a substantially lower computation time than the conventional DMC. Another conclusion that can be drawn from this data, is that while the size of the control and prediction horizon have a drastic effect on the computational time of the conventional DMC, the effect on the stateless discrete predictive controller is minimal at most. This is a significant feature on account of the prediction and control horizon lengths being limited in conventional DMC tunning due to computational time.

12. Robustness and Stability 12.1 Stability

Through the derivation of the controller, a unique controller transfer function would be created for each different system. Using the first order system as a template and example, the process of evaluating the stability can be outlined. Equation 155 contains the transfer function for a first order system and Eq. 156 is the general transfer function of the stateless discrete predictive controller.

$$\frac{C(s)}{U(s)} = \frac{k_p}{\tau s + 1} \tag{155}$$

$$\frac{U(s)}{E(s)} = \frac{d_1 \left( \prod_{i=1}^{n_a} \tau_i s + 1 \right)}{(\Delta t(1-d_3)s + d_3)\left( \prod_{i=1}^{n_a} \tau_i s + 1 \right) - \sum_{j=1}^{n_a}\left( (k_j d_{2j})\left( \prod_{i=1}^{j-1} \tau_i s + 1 \right)\left( \prod_{i=j+1}^{n_a} \tau_i s + 1 \right) \right)} \tag{156}$$

Reducing the general controller transfer function for a first order system is shown in Eq. 157

$$\frac{U(s)}{E(s)} = \frac{d_1(\tau s + 1)}{(\Delta t(1-d_3)s + d_3)(\tau s + 1) - k_p d_{21}} \tag{117}$$

Figures 26, 27:
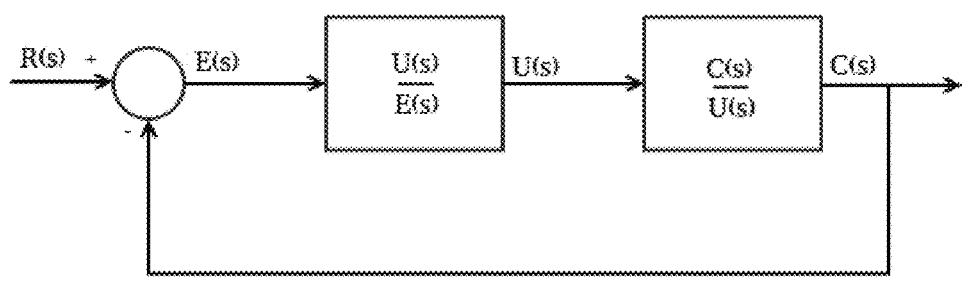
FIG. 26 is a table of computational times for a non-linear robot; Non Linear Controller Computation Times.
FIG. 27 is a block diagram of a structure of a control feedback loop; Control Feedback Loop.

Using the block diagram structure in FIG. 27, the two transfer functions can be combined to find the closed loop transfer function of the entire control structure.

$$\frac{C(s)}{E(s)} = \frac{k_p d_1}{(\Delta t(1-d_3)s + d_3)(\tau s + 1) - k_p d_{21}} \quad (158)$$

Using the generic equation for a closed loop transfer function, the closed loop equation for this system can be derived, show in Eq. 159.

$$\frac{C(s)}{R(s)} = \frac{k_p d_1}{\Delta t \tau (1-d_3)s^2 + (\Delta t + (\tau - \Delta)d_3)s + (d_3 + k_p d_1 - k_p d_{21})} \quad (159)$$

From the derivation of the general linear theory $d_3 = k_p d_{21}$, hence the CLTF equation can be simplified.

$$\frac{C(s)}{R(s)} = \frac{k_p d_1}{\Delta t \tau (1-k_p d_{21})s^2 + (\Delta t + (\tau - \Delta)k_p d_{21})s + k_p d_1} \quad (160)$$

Solving for the poles of Eq. 160 will determine the stability of the system. If any of the poles are on the right hand side of the $j\omega$ axis the system is unstable. Using the quadratic equation, the poles would be stable if the Eq. 161 is true.

$$-b + \sqrt{b^2 - 4ac} < 0 \quad (161)$$

Using the characteristic equation of the CLTF the following conditions would determine the stability of the system.

$$\text{Stable if } \{\Delta t + (\tau - \Delta t)k_p d_{21} > 0(\Delta t \tau (1-k_p d_{21}))(k_p d_1) \geq 0 \quad (162)$$

For the stability of a system, the sampling time has to be smaller than the time constant of the system. This means $\tau$ is greater than $\Delta t$ as that is a requirement when selecting a sampling rate. From the derivation of $d_{21}$ it can be noted that it will be a positive value divided by $k_p$. This is the same for $d_1$ in Case 2, Eq. 164.

$$\text{Case } 1\left\{\tau > \Delta t d_{21} = \frac{(+)}{k_p}\right\} \quad (163)$$

Through a closer inspection of the derivation of $d_{21}$ it can be concluded that it has a maximum value of $1/k_p$ due to the $\alpha$ ($\alpha = e^{(-\Delta t/\tau)}$) term being limited to between zero and one.

$$\text{Case } 2\left\{d_1 = \frac{(+)}{k_p} d_{21} = \frac{(+)}{k_p} d_{21} \leq \frac{1}{k_p}\right\} \quad (164)$$

Following this procedure the stability of the stateless discrete predictive controller for any linear system can be theoretically determined. As the controller for nonlinear systems interprets the system as a series of linear models, the stability can be performed and calculated for each of the independent linearized models. This is possible due to the controller being stateless and only incorporating the current model dynamics.

12.2 Robustness

In the design of the stateless discrete predictive controller, one of the advantages of the proposed design is the controller's ability to perform stateless predictions each control cycle. In the conventional DMC the prediction vector is stored and then used again in the next control cycle. Errors in predictions are then carried from one control cycle to the next. In the formulation of the discrete version, the prediction is embedded into the control parameters so it is theoretically equivalent to performing the prediction from scratch each control cycle. To demonstrate this phenomenon various simulations are executed on an underdamped second order system. Equation 165 contains the model equation with the parameters in Table 13. In this table there are two sets of parameters, one for the simulated plant, and the other for the system that the controller was designed for. The difference is used to demonstrate model mismatch in a physical plant.

$$G(s) = \frac{k_p \omega_n^2}{s^2 + 2\zeta \omega_n s + \omega_n^2} \quad (165)$$

TABLE 13

Second Order System Constants

| Model | Parameter | Value |
| --- | --- | --- |
| Plant | $k_p$ | 2.0 |
| Plant | $\zeta$ | 0.7 |
| Plant | $w_n$ | 2.0 |
| Controller | $k_p$ | 1.8 |
| Controller | $\zeta$ | 0.77 |
| Controller | $w_n$ | 2.0 |

The following Table 14, contains the control parameters.

TABLE 14

Second Order Controller Constants

| Description | Symbol | Value |
| --- | --- | --- |
| Prediction Horizon | N | Varying |
| Control Horizon | $n_u$ | Varying |
| Move Suppression | $\lambda$ | 1.01 |

Figure 28A:
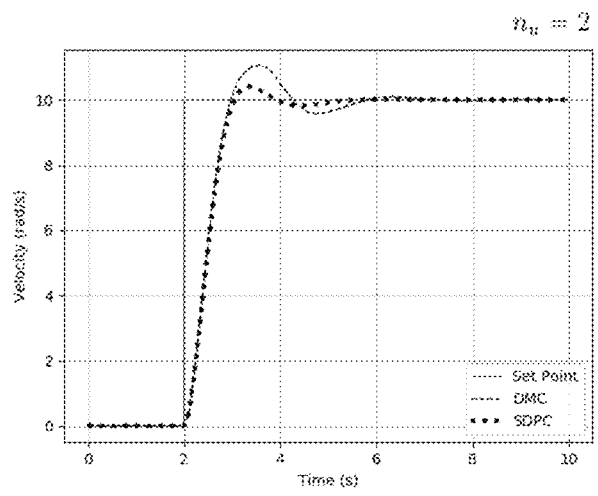
FIGS. 28(a) to (c) are graphs of simulation results for a second order under damped system; Robustness Simulation N=150.
Figure 28B:
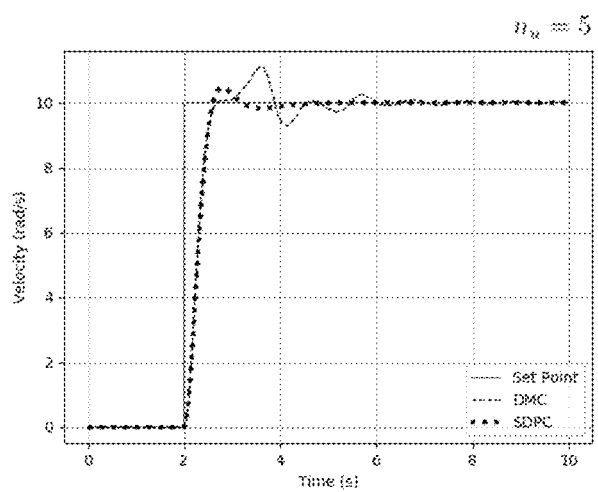
Figure 28C:
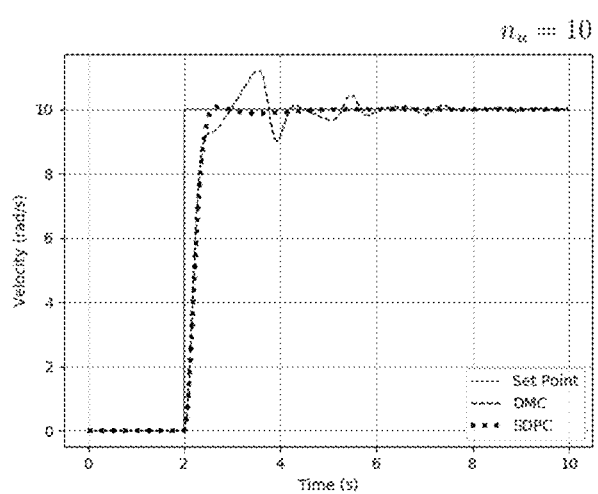
Figure 29A:
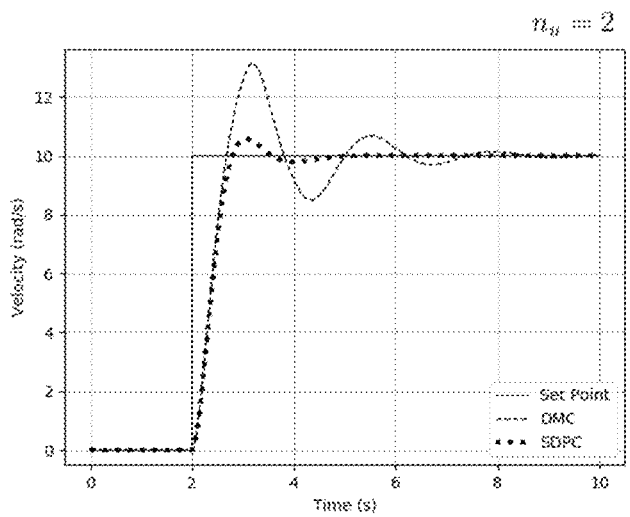
FIGS. 29(a) to (c) are graphs of simulation results for a second order under damped system; Robustness Simulation N=100.
Figure 29B:
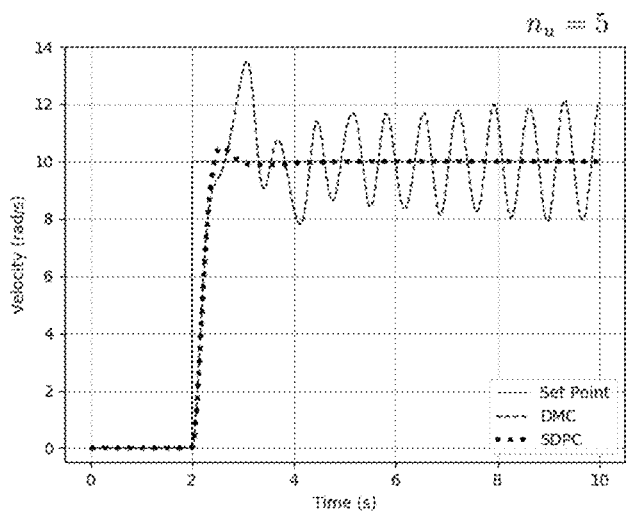
Figure 29C:
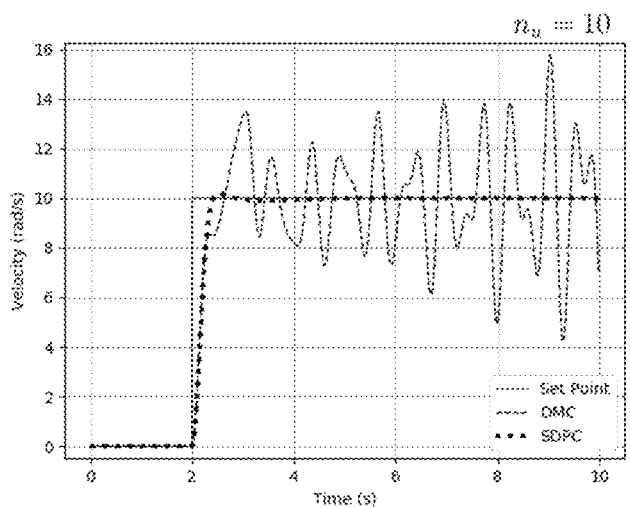
Figure 30A:
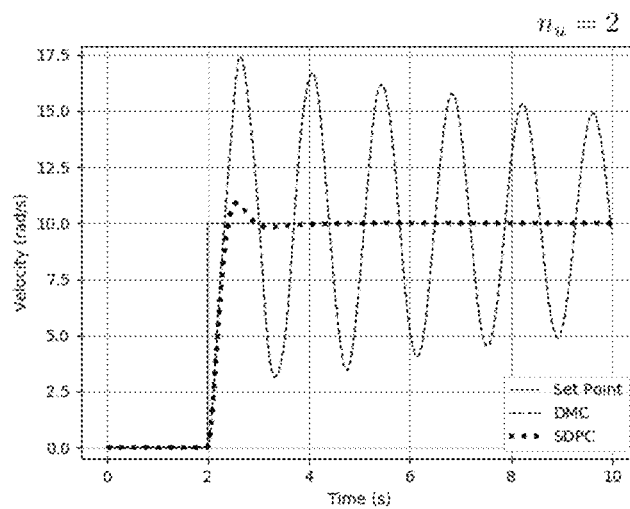
FIGS. 30(a) to (c) are graphs of simulation results for a second order under damped system; Robustness Simulation N=50.
Figure 30B:
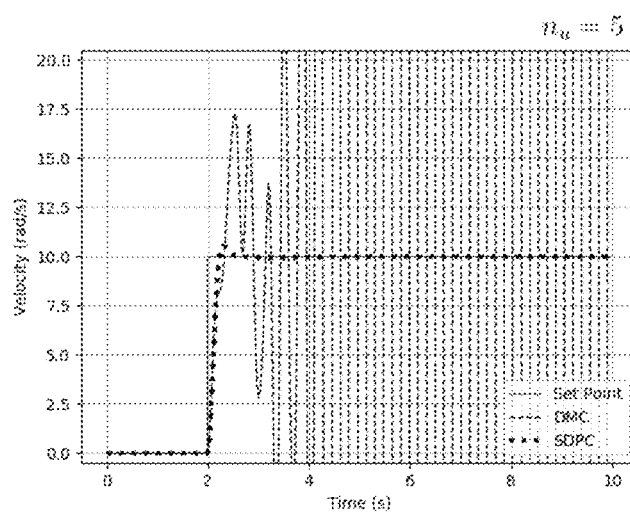
Figure 30C:
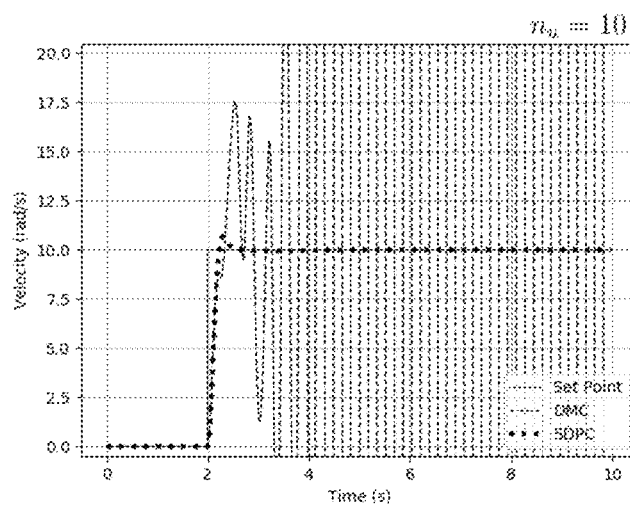

For these simulations the same model is used with three different prediction and control horizons, N=150, 100, 50 and n u=2, 5, 10. As a reference these predictions are 45%, 30%, and 15% of the length required for the model to reach steady state. These nine tests can be seen in FIG. 28, FIG. 29, and FIG. 30. What can be observed is that as the prediction horizon shortens and the control horizon lengthens for the conventional DMC, the systems become more unstable. This is caused by the prediction horizon not reaching steady state, therefore the prediction is appending incorrect values as the algorithm iterates through control cycles. The stateless discrete predictive controller has the same errors in prediction but since the prediction is done based on measured values each cycle, the overall effect is significantly reduced.

13. Experimental System Tests 13.1 Vertical Robot

Figure 31:
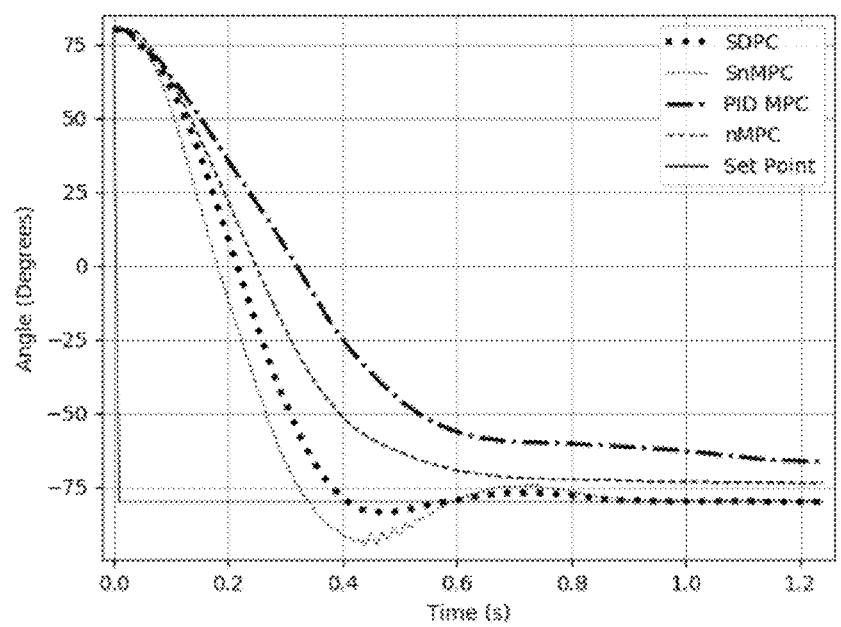
FIG. 31 is a graph of experimental results for test robot; Vertical Robot Test 1 Angle.
Figure 32:
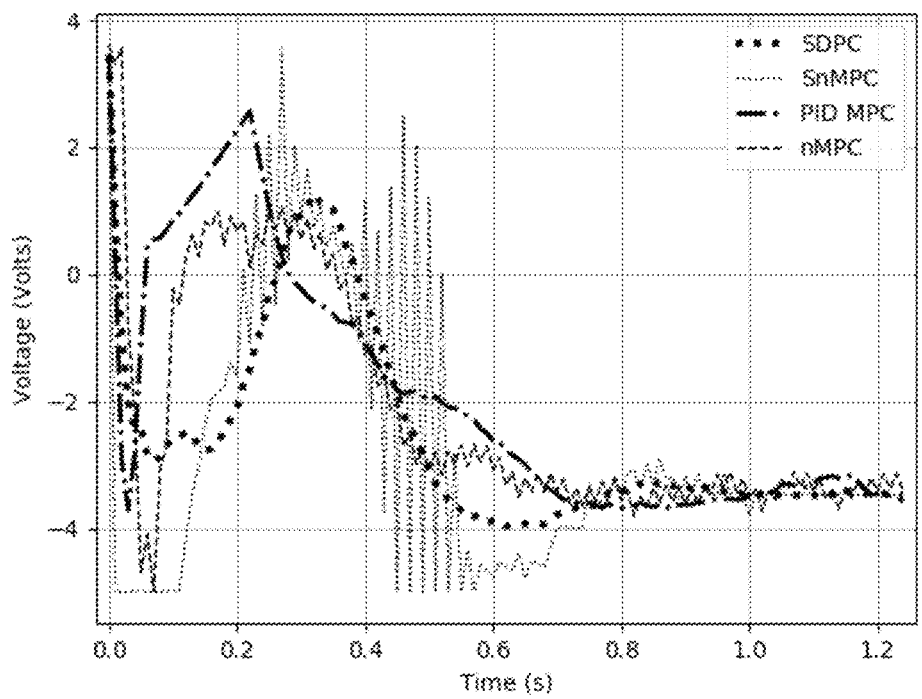
FIG. 32 is a graph of control action corresponding to experiments on the test robot; Vertical Robot Test 1 Voltage.

Using a lab experimental robotic manipulator the stateless discrete predictive controller is tested against the controllers used in the previous work. For the first experiment the controller is given an initial position of 80 degrees from the equilibrium (straight down) with a setpoint of −80 degrees. This swing of 160 degrees is utilized so the manipulator passes through highly variable dynamics and is a thorough test of the controllers nonlinear abilities. FIG. 31 contains the manipulator response with the motor voltage in FIG. 32.

Comparing the response of these controllers, the stateless discrete predictive controller is an improvement over the previously tested controllers. It achieves a reduction in the settling time compared to the Proportional-Integral-Derivative Model predictive control (PID MPC) and the conventional nonlinear Data Management Controller (DMC) (nMPC). Evaluating the voltages provided to the motor demonstrates more about the different control schemes. As was observed in the background work, the simplified MPC (SnMPC) had some issues with stability which is observed in the rapid oscillations in the voltage. In comparison the stateless discrete predictive controller has a much smoother voltage output.

Figure 33:
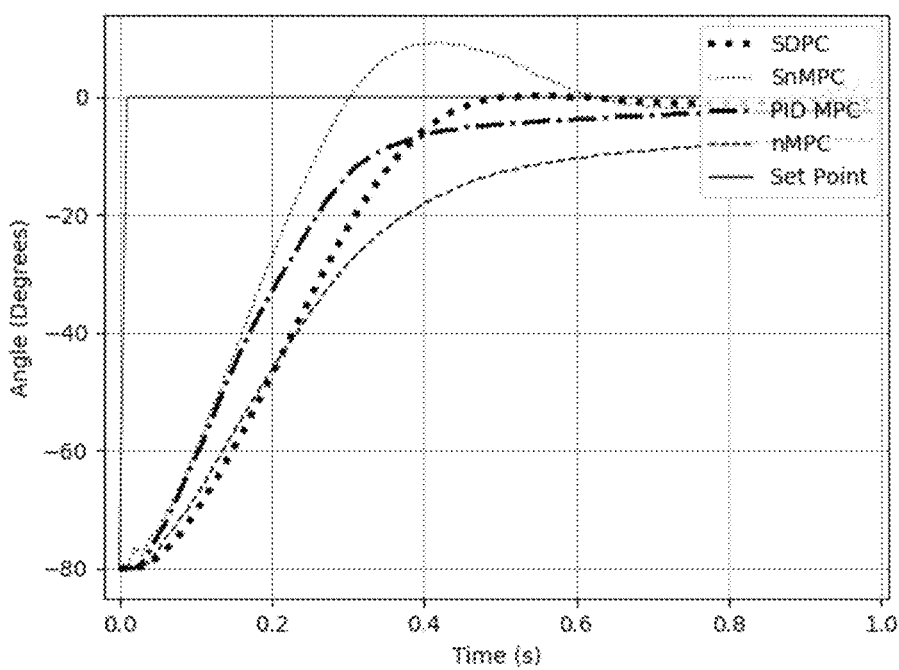
FIG. 33 is a graph of experimental results for test robot; Vertical Robot Test 2 Angle.
Figure 33:
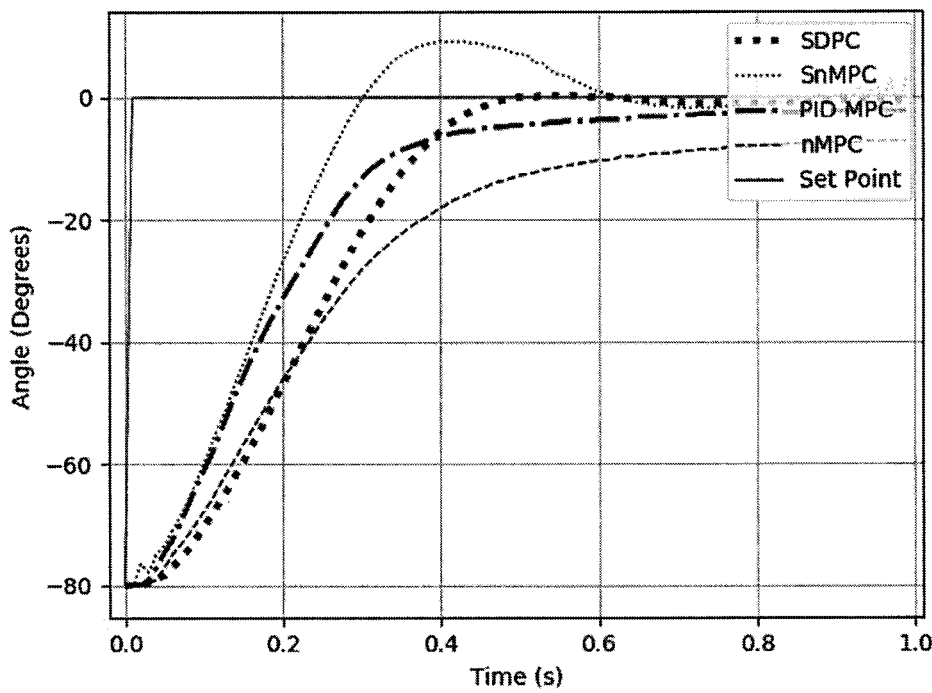
Figure 34:
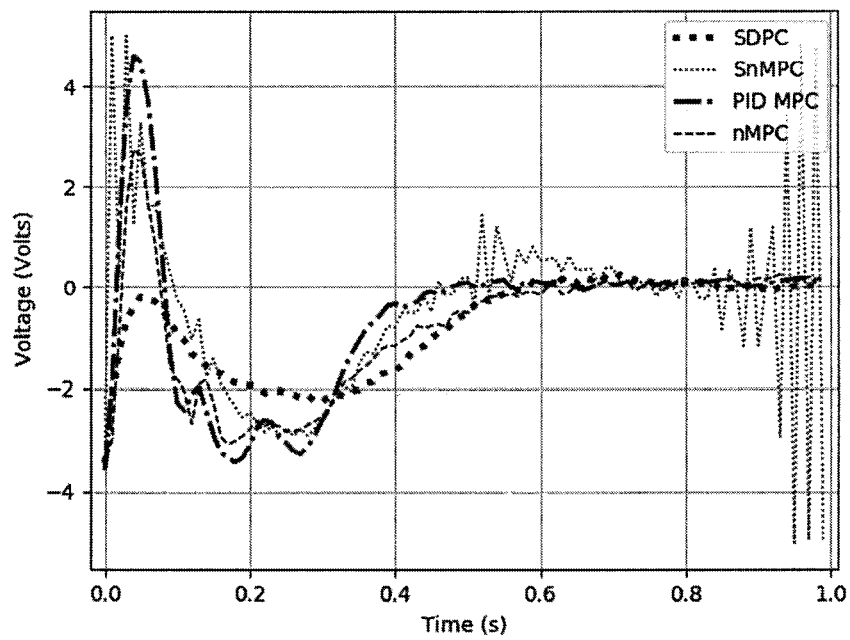
FIG. 34 is a graph of control action corresponding to experiments on the test robot; Vertical Robot Test 2 Voltage.

In the next experiment the same system was used with an initial position of −80 degrees from equilibrium. The setpoint was selected as zero (equilibrium) due to it being the point of highest sensitivity for the robot. Utilizing this feature the controllers ability to achieve a controlled stop can be observed. FIG. 33 and FIG. 34 contains the system response and the voltage respectively.

One key feature that can be seen from the response graph is that the stateless discrete predictive controller settles faster than the other controllers. The SDPC and nMPC is marginally slower for the first 0.2 seconds but the stateless discrete predictive controller rapidly catches up a settles faster than the other controllers. From the voltage graph it is apparent the simplified MPC is again oscillating and approaching instability. The PID MPC and the conventional nonlinear MPC are better in terms of oscillations but the SDPC is significantly smoother.

13.2 Kuka Robot

Figure 35:
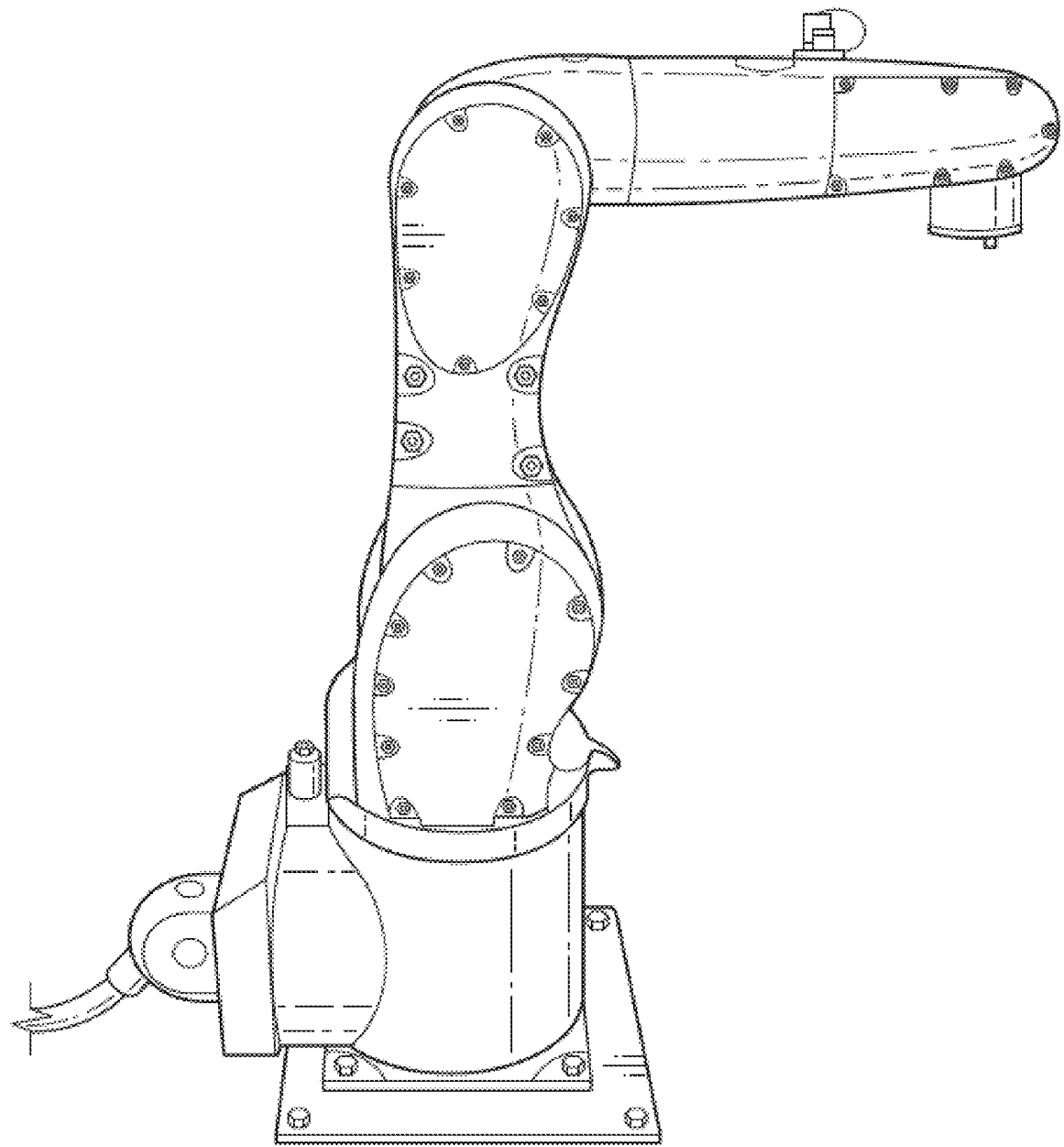
FIG. 35 is a photograph of the industrial robot used for testing; Kuka Robot.

Another experiment was performed using an industrial Kuka serial manipulator, which can be seen in FIG. 35. These manipulators have been designed to track predefined profiles. However, as they are being utilized for more complex applications where the tasks they are performing can vary from cycle to cycle. As a result, Kuka developed a Robot Sensor Interface (RSI), a software that allows offsets to be sent to the robot in realtime at a sampling time of four milliseconds.

The current configuration is such that the offsets are directly added on the inputs to the servomotors for the joints. The addition of a controller would allow the robot to respond to this offset faster, giving the robot a faster response time. The performance of the different schemes will be evaluated based upon settling time with the secondary objective being stability during motion. The experimental setup is conducted with the robot initially in the cannon position and is given a step offset in at X-Z plane. This planar work envelope was selected because of the coupled nature introduced from the parallel robot joints two and three. During testing of the system and determination of the system model it was observed that there is notable dead time in the system (approximatively 0.024 seconds). Due to the four millisecond sampling rate, the benchmark controllers are limited which lead to the following being selected: conventional MIMO DMC, PID, no controller with acceleration limits. Within the RSI functionality of the KUKA there is no controller, it takes the displacement offset and drives the motors to achieve this new position. In the experiments that were conducted, if these values had been sent directly to servos they would faulted due to a high torque limit. Generally this would be avoided through displacement limits but this would be impractical as a reasonably safe limit of 0.2 millimeters per time step would mean it would be at least 2 seconds for an offset of 40 millimeters to be applied.

Figure 36:
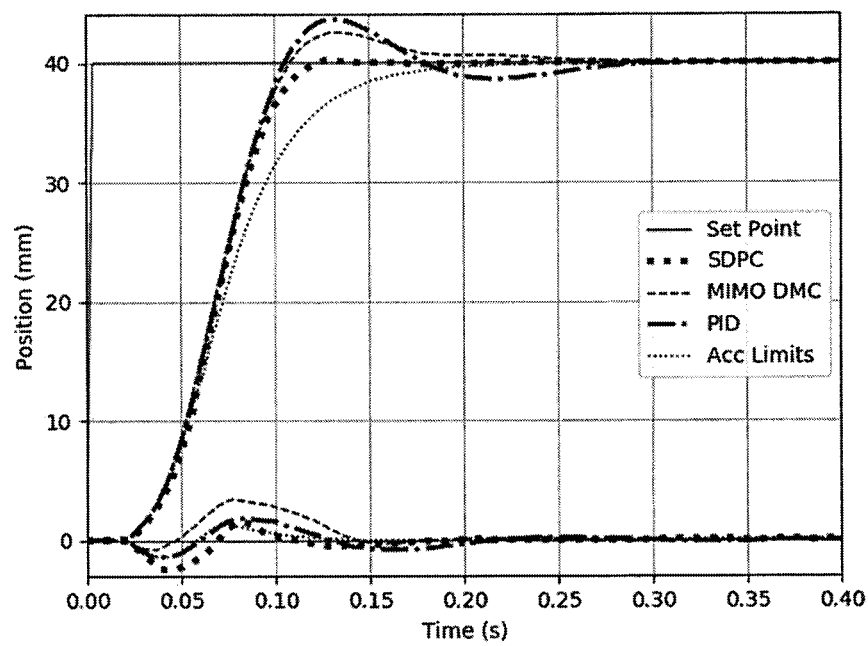
FIG. 36 is a graph of experimental results for the Kuka; Kuka Position Test 1.
Figure 37:
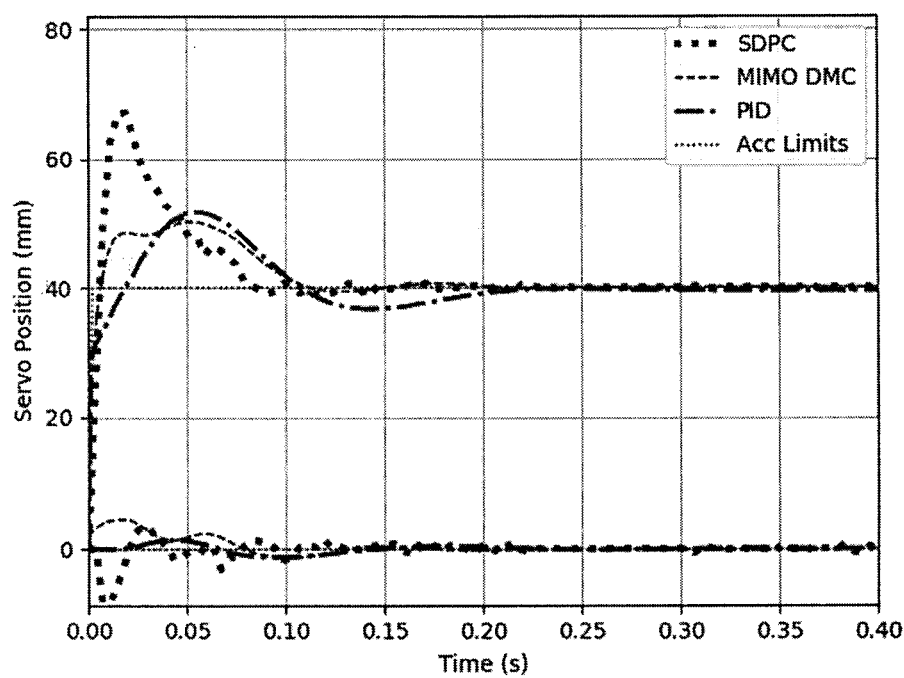
FIG. 37 is a graph of control action corresponding to experiments on the Kuka; Kuka Servo Inputs Test 1.

FIG. 36 shows an experiment where a 40 millimeter offset in the X-axis was sent to the system, FIG. 37 shows the actual offset sent to the servos. From this figure it can be noted that the stateless discrete predictive controller has a reduced settling time when compared to all of the others. It should be noted that the Z-axis had some movement due to the coupling effect of the two axes, which is expected as the controller is minimizing the combined error between all the axes.

Figure 38:
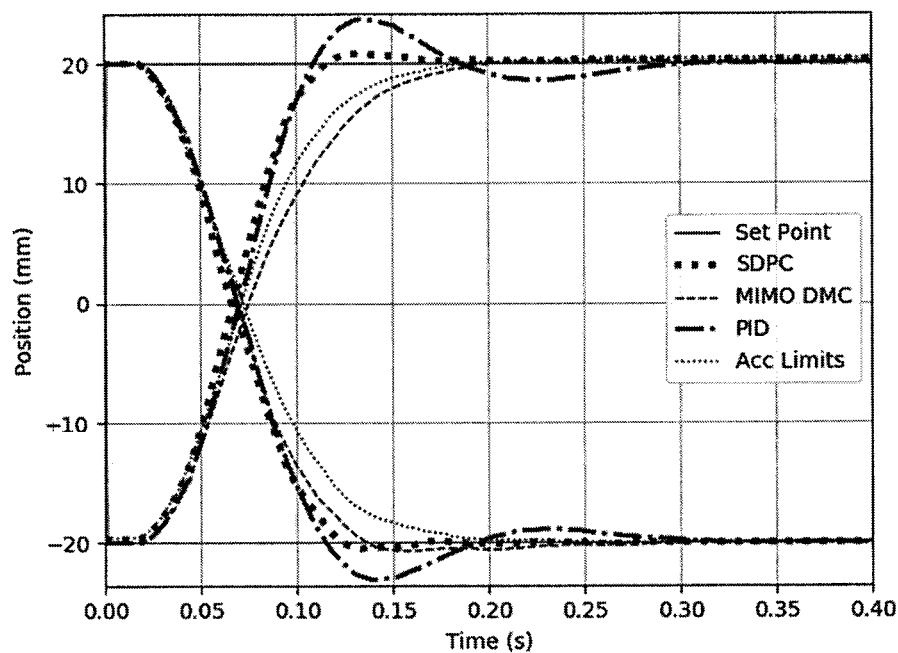
FIG. 38 is a graph of experimental results for the Kuka; Kuka Position Test 2.
Figure 39:
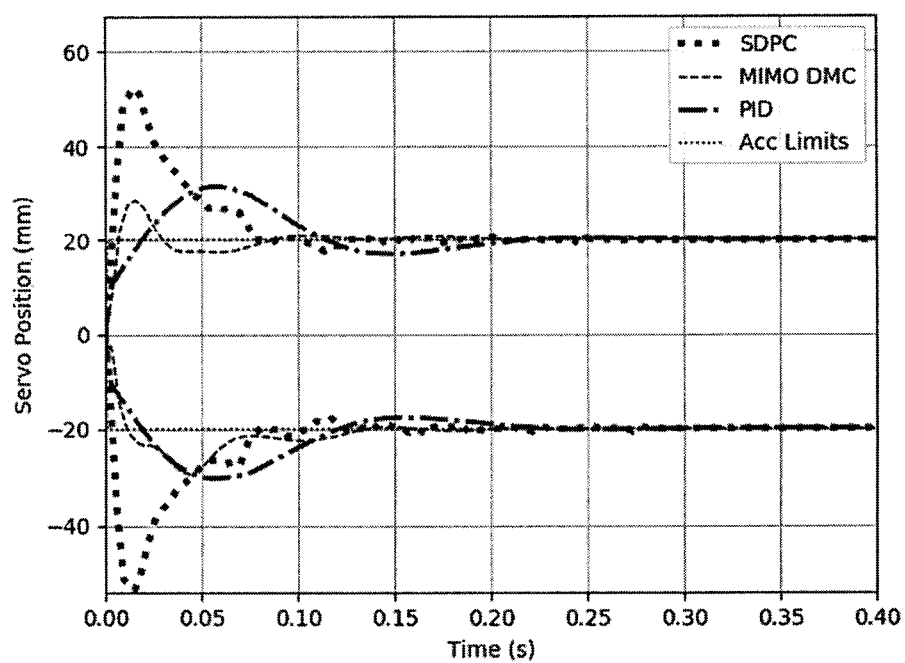
FIG. 39 is a graph of control action corresponding to experiments on the Kuka; Kuka Servo Inputs Test 2.

FIG. 38 shows an experiment where a positive 40 millimeter offset in the X direction and a negative 40 millimeter offset in the Z direction was sent to the system. FIG. 39 contains the actual positions sent to the servo during this experiment. Again in this experiment the discrete controller achieve a reduced settling time when compared to the other options.

As this is a complex system with varying dynamics throughout the workspace, it is expected that the traditional control schemes like PID would have diminished performance. Looking at the conventional DMC controller, the performance issue it is having occurs as it moves through the varying dynamics. It can be observed that in the first experiment there was overshoot while there was none during the second experiment in the X axis. Being stateless, the discrete model predictive controller is able to account for these varying dynamics with less of an impact on performance.

In one embodiment, the invention relates to a computer-implemented method for controlling a dynamical system to execute a task, including providing a model of the dynamical system, computing control parameters, based on an optimization of future control actions in order to reduce predicted errors using the model of the dynamic system prior to executing a control loop iteration, including, computing future error values based on differences between predicted outputs of the model of the dynamical system and a set point where the current state of the dynamical system is undefined; and algebraically optimizing the future errors, storing the computed control parameters in a memory device executing at least one control loop iteration including, obtaining from a sensor at least one input representing a current state of the dynamical system, computing an error value based on the difference between the current state of the dynamical system to a desired state of the dynamical system, accessing at least one of the stored control parameters, and generating, based on the accessed control parameters and the error value, at least one control output, and, transmitting the at least one control output to the dynamical system for executing one or more control actions to adjust the current state of the dynamical system during execution of the task to reduce the error value. The dynamical system can be a dynamically rapid system, where the time constant of the dynamically rapid system to the control loop cycle time ratio is less than about 100 or where the time constant is under about one second. The dynamically rapid system can be selected from the group consisting of robots, injection molding machines, computer numerical control (CNC) machines and servo drives. The stored control parameters can each be associated with an operating range of the dynamical system.

The invention claimed is:

1. A computer-implemented method for controlling a dynamical system to execute a task, comprising:

providing a model of the dynamical system;

computing control parameters, based on an optimization of future control actions in order to reduce predicted errors using the model of the dynamical system prior to executing any control loop iterations for the dynamical system, comprising;

computing future error values based on differences between predicted outputs of the model of the dynamical system and a set point where the current state of the dynamical system is undefined; and algebraically optimizing the future errors, storing the computed control parameters in a memory device;

executing at least one control loop iteration comprising:

obtaining from a sensor at least one input representing a current state of the dynamical system;

computing an error value based on the difference between the current state of the dynamical system to a desired state of the dynamical system;

accessing at least one of the stored control parameters, and generating, based on the accessed control parameters and the error value, at least one control output; and, transmitting the at least one control output to the dynamical system for executing one or more control actions to adjust the current state of the dynamical system during execution of the task to reduce the error value.

2. The computer-implemented method of claim 1, wherein the step of computing the control parameters further comprises computing the variables:

Variables:

$s$ LaPlace frequency variable $\Delta t$ Controller sample time $d_1 = \hat{d}_1(1)$ $d_{2i} = \hat{d}_{2i}(1)$ $d_3 = \sum_{i=1}^{n_a} k_i d_{2i}$ $\hat{d}_1 = M^{-1} A^T \begin{bmatrix} 1 \\ 1 \\ \vdots \\ 1 \end{bmatrix}$ $\hat{d}_{2i} = M^{-1} A^T \begin{bmatrix} (1-\alpha_i) \\ (1-\alpha_i^2) \\ \vdots \\ (1-\alpha_i^N) \end{bmatrix}$ $A = \begin{bmatrix} \hat{c}_1 & 0 & \cdots & 0 \\ \hat{c}_2 & \hat{c}_1 & \cdots & 0 \\ \vdots & \vdots & \ddots & \vdots \\ \hat{c}_N & \hat{c}_{N-1} & \cdots & \hat{c}_{N-n_a+1} \end{bmatrix}$ $M =$ $\begin{bmatrix} \lambda \sum_{j=1}^{N} (\hat{c}_j)^2 & \sum_{j=1}^{N-1}(\hat{c}_j)(\hat{c}_{j+1}) & \cdots & \sum_{j=1}^{N-n_u+1}(\hat{c}_j)(\hat{c}_{j+n_u-1}) \\ \sum_{j=1}^{N-1}(\hat{c}_j)(\hat{c}_{j+1}) & \lambda \sum_{j=1}^{N-1}(\hat{c}_j)^2 & \cdots & \sum_{j=1}^{N-n_u+1}(\hat{c}_{jj})(\hat{c}_{j+n_u-2}) \\ \vdots & \vdots & \ddots & \vdots \\ \sum_{j=1}^{N-n_u+1}(\hat{c}_j)(\hat{c}_{j+n_u-1}) & \sum_{j=1}^{N-n_u+1}(\hat{c}_j)(\hat{c}_{j+n_u-2}) & \cdots & \lambda \sum_{j=1}^{N-n_u+1}(\hat{c}_j)^2 \end{bmatrix}$ $\hat{c}_j = \sum_{i=1}^{n_a} k_i(1-\alpha_i^j)$ $\alpha_i$ Constant $\left( e^{\frac{-\Delta t}{\tau_i}} \right)$ Tunning Parameters:
N Prediction horizon length
$n_u$ Control horizon length
$\lambda$ Move suppression factor where the model of the dynamic system is defined by the equation:

$$\frac{Y(s)}{U(s)} = \sum_{i=1}^{n_a} \frac{k_i}{\tau_i s + 1}$$

System Constants:
$n_a$ Order of the system
$\tau_i$ $i^{th}$ order time constant
$k_i$ $i^{th}$ order gain and where:
Y(s) is a control output,
U(s) is an input.

3. The computer-implemented method of claim 2, wherein the step of generating at least one control output further comprises executing the following equation:

$$\frac{U(s)}{E(s)} = \frac{d_1 \left( \prod_{i=1}^{n_a} \tau_i s + 1 \right)}{(\Delta t(1-d_3)s + d_3)\left( \prod_{i=1}^{n_a} \tau_i s + 1 \right) - \sum_{j=1}^{n_a} \left( (k_j d_{2j}) \left( \prod_{i=1}^{j-1} \tau_i s + 1 \right) \left( \prod_{i=j+1}^{n_a} \tau_i s + 1 \right) \right)}$$

where E(s) is an error between the system output and desired output.

4. The computer-implemented method of claim 2, wherein the dynamical system is a dynamically rapid system, where the time constant of the dynamically rapid system to the control loop cycle time ratio is less than about 100 or where the time constant is under about one second.

5. The computer-implemented method of claim 4, wherein the dynamically rapid system is selected from the group consisting of robots, injection molding machines, CNC machines and servo drives.

6. The computer-implemented method of claim 1, wherein the stored control parameters are each associated with an operating range of the dynamical system.

\* \* \* \* \*